US011098770B2

(12) United States Patent
Cioc et al.

(10) Patent No.: US 11,098,770 B2
(45) Date of Patent: Aug. 24, 2021

(54) DUAL-ACTING ELECTRIC ONE-WAY CLUTCH ASSEMBLY

(71) Applicant: MAGNA POWERTRAIN, INC., Concord (CA)

(72) Inventors: Adrian C. Cioc, North York (CA); David Victor Dorigo, Oakville (CA)

(73) Assignee: MAGNA POWERTRAIN, INC., Concord (CA)

(*) Notice: Subject to any disclaimer, the term of this patent is extended or adjusted under 35 U.S.C. 154(b) by 166 days.

(21) Appl. No.: 16/344,975

(22) PCT Filed: Nov. 10, 2017

(86) PCT No.: PCT/CA2017/000243
§ 371 (c)(1),
(2) Date: Apr. 25, 2019

(87) PCT Pub. No.: WO2018/085920
PCT Pub. Date: May 17, 2018

(65) Prior Publication Data
US 2019/0271365 A1    Sep. 5, 2019

Related U.S. Application Data

(60) Provisional application No. 62/419,994, filed on Nov. 10, 2016.

(51) Int. Cl.
*F16D 41/16* (2006.01)
*F16D 27/102* (2006.01)
(Continued)

(52) U.S. Cl.
CPC .............. *F16D 41/16* (2013.01); *F16D 27/00* (2013.01); *F16D 27/102* (2013.01); *F16D 41/14* (2013.01)

(58) Field of Classification Search
CPC .......... F16D 41/12; F16D 41/14; F16D 41/16; F16D 27/00; F16D 27/10; F16D 27/102
See application file for complete search history.

(56) References Cited

U.S. PATENT DOCUMENTS 6,290,044 B1 *  9/2001  Burgman ................ F16D 41/18
192/46
8,079,453 B2 * 12/2011  Kimes ................... F16D 41/125
192/43.1
(Continued)

FOREIGN PATENT DOCUMENTS

DE    102008059188 A1 *  6/2010  ........... F16D 41/125
WO    WO-2015013802 A1 *  2/2015  ............. F16D 41/16
WO    WO2016170428 A1    10/2016

OTHER PUBLICATIONS

International Search Report and Written Opinion dated Feb. 16, 2018 from corresponding International Patent Application No. PCT/CA2017/000243.

*Primary Examiner* — Charles A Fox
*Assistant Examiner* — Lori Wu
(74) *Attorney, Agent, or Firm* — Dickinson Wright PLLC

(57) ABSTRACT

A dual-acting selectable one-way coupling (SOWC) device configured to include a clutch module and an electromagnetic actuator module. The clutch module includes an outer race and an inner race assembly rotatable relative to the outer race. The inner race assembly including a rotatably driven first inner race member, a second inner race member, and compliant connector members drivingly interconnecting the first and second race members. The electromagnetic actuator module includes an electromagnetic actuator operable to releasably engage the second inner race member. An auxiliary locking assembly is operable to independently releasably engage the second inner race member.

19 Claims, 22 Drawing Sheets

(51) Int. Cl.
*F16D 27/00* (2006.01)
*F16D 41/14* (2006.01)

(56) References Cited

U.S. PATENT DOCUMENTS

| | | | | |
|---|---|---|---|---|
| 8,196,724 | B2* | 6/2012 | Sarnie | F16D 41/14 192/43.1 |
| 8,276,725 | B2* | 10/2012 | Swales | F16D 41/16 192/43.1 |
| 8,418,825 | B2* | 4/2013 | Bird | F16D 41/14 192/46 |
| 8,491,439 | B2* | 7/2013 | Kimes | F16D 41/084 475/324 |
| 2002/0166749 | A1* | 11/2002 | Bertrand | F16D 3/004 192/213.12 |
| 2012/0103745 | A1 | 5/2012 | Bird | |
| 2013/0319810 | A1* | 12/2013 | Bird | F16D 41/14 192/45.1 |
| 2013/0319812 | A1 | 12/2013 | Wys et al. | |
| 2016/0160941 | A1 | 6/2016 | Green et al. | |
| 2018/0100551 | A1* | 4/2018 | Campton | F16D 28/00 |
| 2018/0355927 | A1* | 12/2018 | Greene | F16D 27/108 |
| 2019/0063505 | A1* | 2/2019 | Ito | F16F 15/13469 |

\* cited by examiner

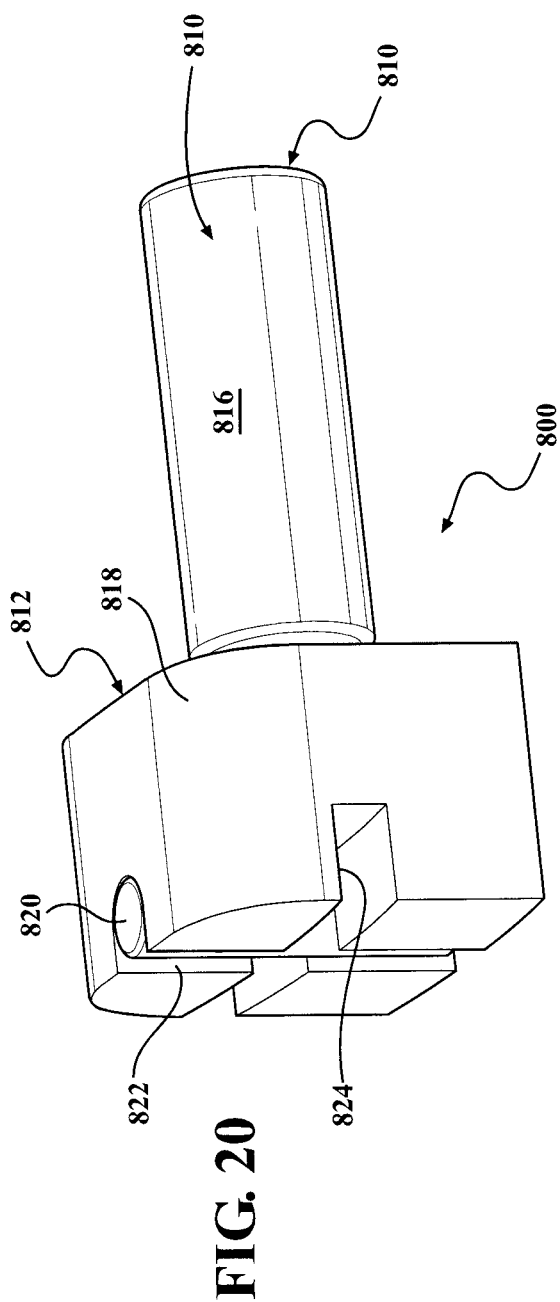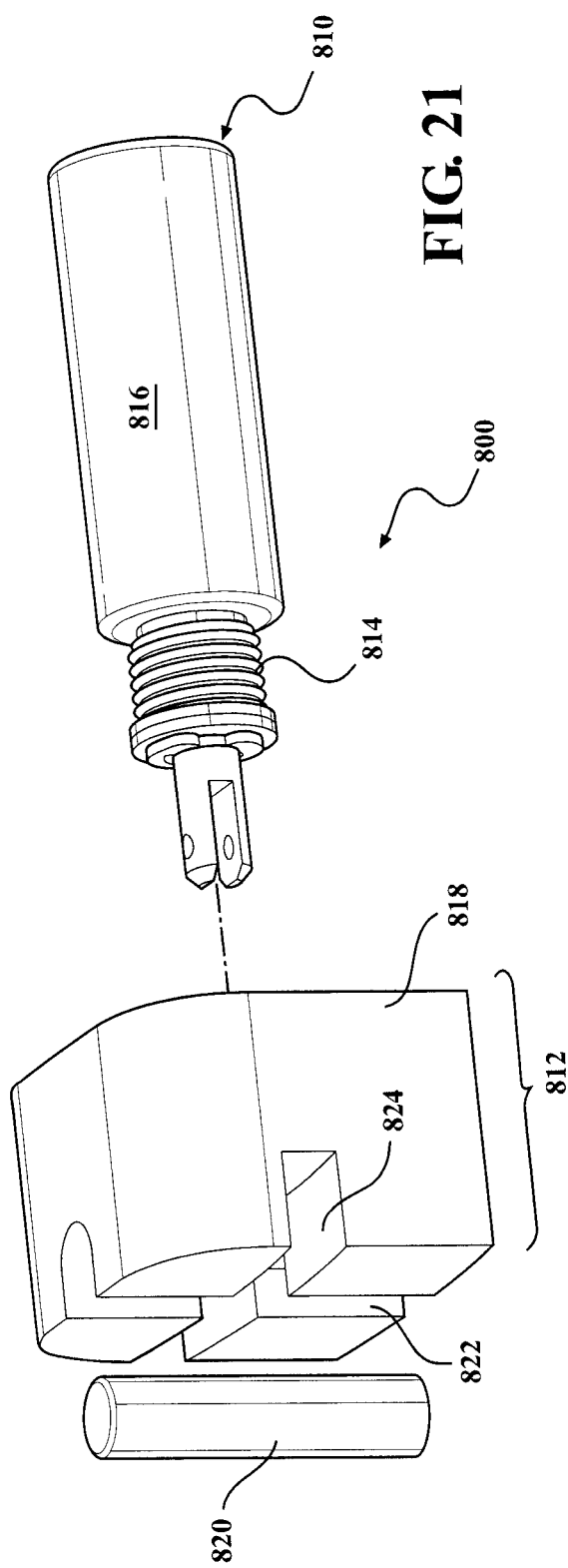

DUAL-ACTING ELECTRIC ONE-WAY CLUTCH ASSEMBLY

FIELD OF THE INVENTION

The present disclosure is generally related to overrunning coupling devices such as one-way clutches and brakes and, more specifically, to power-operated or selectable one-way coupling (SOWC) devices having an electromagnetic actuator assembly.

BACKGROUND OF THE INVENTION

This section provides background information related to the present disclosure which is not necessarily prior art.

Automatic transmissions provide a plurality of forward and reverse gear ratios by selectively actuating one or more clutches and/or brakes to establish a releasable, torque-transmitting drive connection between a transmission input and a transmission output for supplying motive power (i.e. drive torque) from a powertrain to at least one pair of ground-engaging wheels in a motor vehicle. Historically, automatic transmissions have been equipped with hydraulically-actuated multi-plate friction clutches and/or brakes in association with planetary gearsets to establish the different gear ratios. In addition to multi-plate friction coupling devices, many automatic transmissions are also equipped with one or more overrunning coupling devices, commonly referred to as one-way coupling (OWC) devices, which function to overrun when one of its races (in a radial configuration) or one of its drive plates (in an axial configuration) rotates in a first (i.e. freewheel) direction relative to the other race or drive plate, and engages or locks when the one races or drive plate attempts to rotate in the second (i.e. lockup) direction. OWC devices are known to reduce drag losses associated with multi-plate friction couplings and also offer cost reductions associated with the removal of the friction clutch plates, pressure plates, pistons and seals. However, conventional OWC devices provide no independent control over the modes of operation, that is to say whether they lockup or freewheel in both directions. As such, basic OWC devices provide a "lockup" mode in one rotary direction and a "freewheel" mode in the opposite direction based on the direction that the torque drive is being applied to input race or drive plate.

There are however, requirements in modern automatic transmissions where a "controllable" overrunning coupling device, commonly referred to as a selectable one-way coupling (SOWC) device, can be selectively controlled to provide additional functional modes of operation. Specifically, a selectable one-way coupling device may further be capable of providing a freewheel mode in both rotary directions until a command signal (i.e., from the transmission controller) causes a power-operated actuator to shift the coupling device into its lockup mode. Thus, a selectable one-way coupling device may be capable of providing a drive connection between an input member and an output member in one or both rotational directions and it may also be operable to freewheel in one or both directions.

In some instances, the selectable one-way coupling device installed in automatic transmissions utilize a hydraulic actuator to selectively actuate the overrunning coupling and shift between the available operating modes. Examples of conventional selectable one-way coupling devices that are hydraulically-actuated are disclosed in U.S. Pat. Nos. 6,290,044, 8,079,453 and 8,491,439. In contrast, it is also known to use an electro-mechanical actuator with the selectable one-way coupling device, one example of which is disclosed in U.S. Pat. No. 8,196,724.

As a further alternative, development has recently been directed to electromagnetic actuators for use with selectable one-way coupling devices, examples of which are disclosed in U.S. Pat. Nos. 8,276,725 and 8,418,825 and U.S. Publication 2013/0319810. In many such electromagnetic actuators, a rocker-type locking element, commonly referred to as a strut, is pivoted from a first (i.e. non-deployed) position to a second (i.e. deployed) position in response to energization of a coil assembly. The freewheel mode is established when the strut is located in its non-deployed position while the lockup mode is established when the strut is located in its deployed position. In many conventional selectable one-way coupling devices equipped with an electromagnetic actuator, a direct-acting configuration is used such that the strut is part of the magnetic circuit and its pivotal movement is caused by an attraction force applied directly to the strut via energization of the coil assembly. Therefore, precise control of the air gap established between the core/pole piece of the coil assembly and the magnetic strut is required to provide robust and reliable lockup functionality.

More recently, electromagnetic actuators have been developed for use with selectable one-way coupling devices having an indirect strut actuation configuration. Specifically, an intermediate member is mechanically coupled to the strut and functions to move the strut between its non-deployed and deployed positions in response to energization of the coil assembly. One such SOWC device is disclosed in PCT Publication No. WO2015/013802.

While all of the different types of selectable one-way coupling devices mentioned above appear to meet all functional requirements, a need exists to continue development of new and improved power-operated actuator modules and clutch modules that advance the art and provide enhanced functionality.

SUMMARY OF THE INVENTION

This section provides a general summary of the inventive concepts associated with the present disclosure and is not intended to be interpreted as a complete and exhaustive listing of all aspects, features, objectives and advantages.

It is an objective of the present disclosure to provide a selectable one-way coupling (SOWC) device including a clutch module and at least one electromagnetic actuator module having at least one electromagnetic actuator.

It is a related objective of the present disclosure to equip the SOWC device with an electromagnetic actuator including an energizable coil assembly and a locking member moveable between non-deployed and deployed positions in response to controlled energization of the coil assembly. The locking member is preferably a pivotable strut member that can be arranged for direct actuation or indirect actuation based on the configuration of the electromagnetic actuator.

It is another objective of the present disclosure to configure the clutch module to include a first clutch member to which the at least one electromagnetic actuator module is fixed and a second clutch member rotatable relative to the first clutch member and having a plurality of ratchet-type locking surfaces. The strut associated with each of the at least one of the electromagnetic actuators is operable in its non-deployed position to be released from engagement with the locking surfaces and is further operable in its deployed position to lockingly engage one of the locking surfaces.

It is another objective of the present disclosure to configure the electromagnetic actuator module to include a first electromagnetic actuator operable to provide a lockup mode in a first direction and a second electromagnetic actuator operable to provide a lockup mode in a second direction so as to provide a dual-acting SOWC device.

It is a further objective of the present disclosure to equip the SOWC device with an auxiliary locking assembly configured to provide a bi-directional lockup mode with the at least one electromagnetic actuator released so as to provide a power-off locked functionality. Second locking surfaces on the second clutch member interact with a moveable latching unit associated with the auxiliary locking assembly to provide the bi-directional lockup mode.

In accordance with these and other objectives of the present disclosure, a clutch assembly is provided having a clutch module and at least one electromagnetic actuator module. The clutch module includes a first clutch member and a second clutch member having a plurality of cam surfaces, at least one of the first and second clutch members being adapted to rotate relative to the other clutch member. The electromagnetic actuator module includes an actuator frame adapted to be mounted to the first clutch member and at least one electromagnetic actuator mounted to the actuator frame. The electromagnetic actuator includes an energizable coil assembly secured to the actuator frame, an active strut assembly having a connection member mounted to the frame for pivotal movement relative to the coil assembly between a non-actuated position and an actuated position, a locking member mechanically interconnected to the connection member for movement between a non-deployed position and a deployed position in response to pivotal movement of the connection member between its non-actuated position and its actuated position, and a biasing member for normally biasing the locking member into its non-deployed position. Energization of the coil assembly generates a magnetic circuit that causes the connection member to move to its actuated position which concomitantly causes the locking member to move to its deployed position in opposition to the biasing exerted by the biasing member. The locking member is released from engagement with the cam surfaces when located in its non-deployed position and is lockingly engaged with one of the cam surfaces when located in its deployed position.

In accordance with one embodiment, the connection member is a magnetic armature and the locking member is a strut, wherein the armature has a first end segment pivotably coupled to the actuator frame and a second end segment mechanically interconnected to the strut. In one preferred arrangement, the armature and strut are oriented in an offset configuration. In another preferred arrangement, the armature is oriented to be located between the coil assembly and the strut in an under-strut configuration.

In accordance with another embodiment, the coil assembly is a solenoid having a linearly-moveable plunger operably coupled to the connection member to control movement of the strut in response to energization of the solenoid.

In accordance with another embodiment, the clutch module associated with the clutch assembly includes a first clutch member defining a fixed outer race and a second clutch member defining an inner race assembly rotatable relative to the outer race. The inner race assembly is configured to include a first inner race member drivingly connected to a rotary component, a second inner race member formed to include the cam surfaces, and a plurality of compressible connector members drivingly connecting the second inner race member to the first inner race member.

In accordance with a further embodiment, the clutch assembly includes an auxiliary locking assembly operable to selectively inhibit rotation of the second clutch member relative to the first clutch member without energizing the coil assembly of the electromagnetic actuator.

Further areas of applicability of the present disclosure will become apparent from the detailed description, drawings and specific example provided hereinafter. It should be understood that the detailed description, drawings and specific examples, while indicating preferred embodiments of the present disclosure, are intended for purposes of illustration only and are not intended to limit the scope of the invention.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 20 is an assembly view of the auxiliary locking assembly;

FIG. 21 is an exploded view of the auxiliary locking assembly shown in FIG. 19.

DETAILED DESCRIPTION

Figure 1:
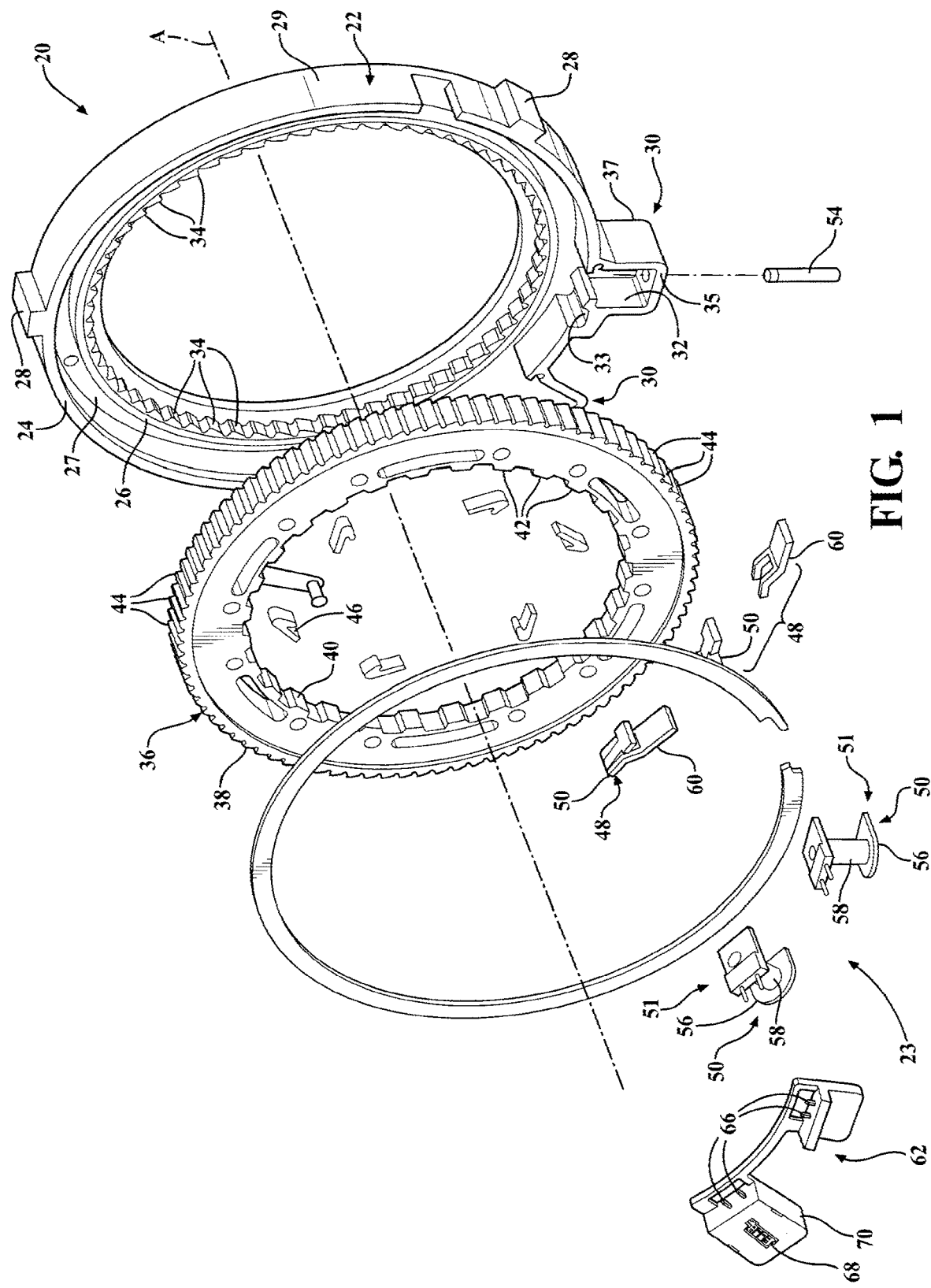
FIG. 1 is an exploded perspective view of a bi-directional clutch assembly configured to include a passive one-way coupling device and a selectable one-way coupling device having an electromagnetic actuator module with a lead frame and integrated safety switch in accordance with an aspect of the disclosure.

Example embodiments will now be described more fully with reference to the accompanying drawings. In general, each embodiment is directed to an overrunning coupling device (i.e. brake and/or clutch) having at least a controllable one-way locking device including a moveable locking component (i.e. sprag, strut, etc.) that is controlled, at least in part, via a power-operated (i.e. electromagnetic) actuator. Thus, the overrunning coupling device transmits torque mechanically but is actuated via an electrical actuation system. It is to be recognized the example embodiments only are provided so that this disclosure will be thorough, and will fully convey the scope, which is ultimately defined by the claims, to those who are skilled in the art. Numerous specific details are set forth, such as examples of specific components, devices, and methods, to provide a thorough understanding of embodiments of the present disclosure. It will be apparent to those skilled in the art that certain specific details need not be employed, that example embodiments may be embodied in many different forms, and that neither should be construed to limit the scope of the disclosure or the claims. In some example embodiments, well-understood processes, well-understood device structures, and well-understood technologies are not described in detail.

Referring to FIGS. 1, 3 and 3A-3B, wherein like numerals indicate corresponding parts throughout the several views, unless otherwise stated, a bi-directional clutch assembly 20 is generally shown. As will be detailed in further detail below, bi-directional clutch assembly 20 generally includes a clutch module 21 comprised of a stationary outer race and a rotatable inner race, a passive one-way coupling device having a plurality of passive struts, and a selectable one-way coupling device having an electromagnetic actuator module 23 including at least one active strut assembly and an electromagnetic actuator 51 associated with each active strut assembly. The clutch module 21 of clutch assembly 20 includes a first clutch component, hereinafter defined as an outer housing presenting an outer race 22 that extends annularly about an axis A. It should be recognized that the outer housing/outer race 22 configuration can be constructed as a single piece of material or as separate pieces of material and subsequently fixed to one another, as will be appreciated by one skilled in the art. The outer race 22 includes an outer ring segment 24 and an inner ring segment 26 that are spaced radially from one another and interconnected via a radial web segment 27. The outer ring segment 24 presents a plurality of outer lugs 28 that extend radially outwardly from an outer surface 29 of the outer ring segment 24 for mating with a first component. The first component can be a stationary component (such as a housing of a transmission) or a rotary component (such as a shaft). The outer ring segment 24 further presents at least one, and shown as a pair of electromagnetic actuator support protrusions, referred to hereafter simply as protrusions 30, that extend radially outwardly from the outer surface 29 of the outer ring segment 24. Each of the protrusions 30 forms a radially extending actuator pocket 32 and a strut pocket 33. The respective pockets 32, 33 are shown as being open along one side surface 35, and closed along an opposite side surface 37 by a wall of the protrusion 30. It should be appreciated that more or fewer protrusions 30 could be provided by the outer ring segment 24. The inner ring segment 26 presents a plurality of inner ramp surfaces, hereinafter referred to as inner ratchet teeth 34, that extend radially inwardly and are evenly distributed about the axis A.

The clutch module 21 of clutch assembly 20 further includes an annular inner race 36 that also extends annularly about the axis A. The inner race 36 has an outer rim 38 and an inner rim 40 that are spaced radially from one another by a radial web segment 41. Upon assembly, the outer rim 38 is disposed radially between the outer and inner ring segments 24, 26 of the outer race 22, and the inner rim 40 is disposed radially inwardly from the inner ring segment 26 of the outer race 22. The inner rim 40 of the inner race 36 presents a plurality of inner lugs 42 that extend radially inwardly for mating with a second component (typically a rotary component). Commonly, lugs 42 interconnect a shaft or clutch plates for conjoint rotation with inner race 36. Further, the outer rim 38 of the inner race 36 presents a plurality of outer ramp surfaces, hereinafter referred to as outer ratchet teeth 44, that extend radially outwardly and are evenly distributed about the axis A.

The passive one-way clutch includes a plurality of first locking elements, also referred to as passive struts 46, which are pivotally supported in strut apertures formed in the inner race 36 for pivoting between a deployed or locking position and a non-deployed or unlocking position. In the locking position, the passive struts 46 engage the inner ratchet teeth 34 of the outer race 22 for connecting the outer and inner races 22, 36 to one another during counter-clockwise rotation of the inner race 36 relative to the outer race 22. Therefore, engagement by one or more of the passive struts 46 prevents relative rotation between the outer race 22 and the inner races 36 in the counter-clockwise direction. However, the passive struts 46 still allow relative rotation between the outer and inner races 22, 36, (i.e., overrun) in the clockwise direction when located in the locked position since they ratchet over the ramped profile of the inner ratchet teeth 34. In the unlocked position, the passive struts 46 are radially spaced from the inner ratchet teeth 34 of the outer race 22, therefore also allowing counter-clockwise rotation of the inner race 36 relative to the outer race 22.

In association with the electromagnetic actuator module 23 of the selectable one-way coupling device, at least one active strut assembly 48 is provided, a portion of which is received by each of the strut pockets 33 within the outer ring segment 24. Each of the active strut assemblies 48 includes a second locking member, referred to as an active strut 50, that is selectively pivotably moveable between a deployed or locked position and a non-deployed or unlocked position. In the locked position (FIG. 3A), the active strut 50 lockingly engages the outer ratchet teeth 44 on the inner race 36, thereby locking the outer and inner races 22, 36 to one another during clockwise movement of the inner race 36 relative to the outer race 22. However, the active strut 50 still allows relative displacement between the outer and inner races 22, 36 (i.e., overrun) in the counter-clockwise direction. In the unlocked position (FIG. 3B), the active strut 50 is radially spaced from the outer ratchet teeth 44, thereby allowing the inner and outer races 22, 36 to rotate relative to one another. Furthermore, each of the active strut assemblies 48 includes an intermediate member, referred to as an armature 60, that is disposed adjacent to, and in operable communication with, the active strut 50 for providing the selective pivotal movement of the active strut 50.

The electromagnetic actuator module 23 of the selectable one-way coupling device also includes one or more electromagnetic actuator 51, one of which is associated in operable communication with each active strut 50. Each electromagnetic actuator 51 includes a coil assembly 52. The coil assembly 52 is mounted in the actuator pocket 32 and is radially spaced from the active strut 50 and armature 60. The coil assembly 52 includes an elongate core 54 of a paramagnetic or ferromagnetic, magnetically permeable material, shown by way of example and without limitation as being generally cylindrical, a bobbin 56 disposed about the core 54, and at least one wire coil 58 spirally wrapped about the bobbin 56. Furthermore, the armature 60 is disposed between the active strut 50 and the core 54/coil 58 for pivotal movement of the armature 60 from a non-actuated position toward an actuated position (i.e. toward the core 54) as commanded via energization of the coil assembly 52, and thus providing the pivotal movement of the active struts 50 from the unlocked position into the locked position in response to energization of the coil 58 via electric current.

More specifically, when electric voltage and/or current are applied to the coil 58, the coil 58 becomes an electromagnet producing an electric field (or flux). The flux flows outwards in all directions and transfers through the small preset air gap G (FIG. 3B) between the armature 60 and core 54, which extends through a central through passage of the bobbin 56 of the coil assembly 52. The core 54 becomes selectively magnetized by the energized coil 58, thereby attracting and pivoting the magnetically attracted metallic armature 60 towards the core 54 from the non-actuated position into the actuated position. The resulting pivoting motion of the armature 60 forces the active strut 50 to mechanically deploy radially inwardly due to the linkage between the active strut 50 and the armature 60.

On deployment, the active strut 50 moves from its unlocked position (FIG. 3B) to its locked position (FIG. 3A) where it locates itself against one of the outer ratchet teeth 44 of the inner race 36, effectively locking the inner race 36 from rotating clockwise relative to the outer race 22 and establishing the lockup mode of the selectable one-way coupling device. Disengagement occurs as voltage and/or current is removed from the coil assembly 52, wherein the core 54 is selectively and suddenly demagnetized, thus releasing the armature 60 from being magnetically attracted to the core 54 of the coil assembly 52. A biasing spring 61, positioned within the strut pocket 33 between an end portion of the active strut 50 and the outer race 22, causes the active strut 50 to pivot back to its unlocked position upon de-energization of the coil assembly 52 and demagnification of the core 54. Such movement of the active strut results in corresponding movement of the armature 60 to the non-actuated position. This establishes the freewheel mode for the selectable one-way coupling device.

It should be appreciated that the arrangement of the armature 60, active strut 50, and coil assembly 52 can act to apply a locking force in a radial direction (as shown in FIG. 1) or an axial direction, depending on the layout and/or requirements of the clutch assembly 20. Radial stacked clutch assembly 20 designs offer packaging advantages over their axial counterparts in situations where axial space is tight, e.g., in automatic transmissions. Further, radially applied clutches transmit driving torque directly outwards to be grounded against the transmission housing without the fear of forces being directed axially which could cause problems for the sizing of other system components to compensate for axial force.

Figure 2:
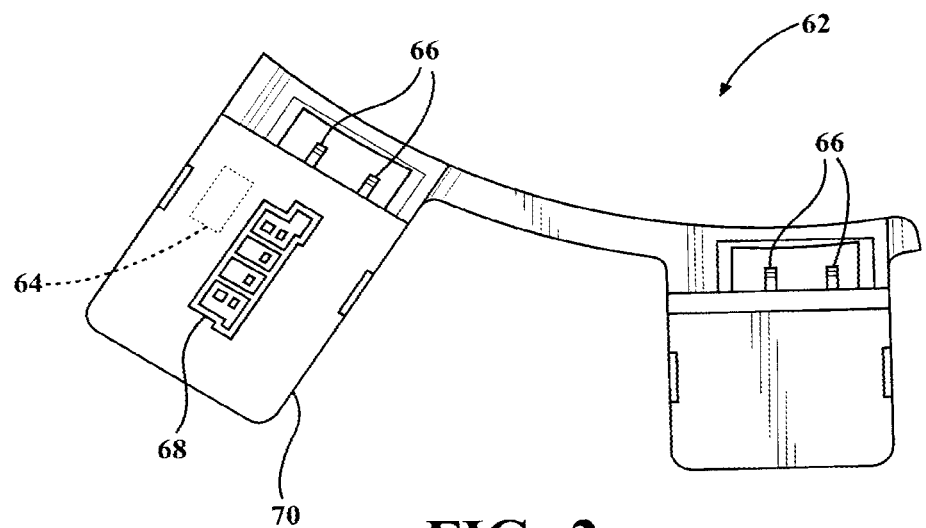
FIG. 2 is a front view of the lead frame and integrated safety switch of FIG. 1.

As shown in FIGS. 1 and 2, the electromagnetic actuator module 23 includes a lead frame 62 attached to each of the electromagnetic actuators 51 for electrically connecting the coils 58 to one another for simultaneously energizing the coils 58. It should be appreciated that the lead frame 62 could connect any number of coils 58. A printed circuit board (PCB) 64 is attached to the lead frame 62 for selectively controlling the energization of the coils 58. The PCB 64 is disposed radially and axially adjacent to one of the coils 58. The lead frame 62 further includes at least one power output contact 66 that is disposed radially and axially adjacent to each of the coils 58 for electrically connecting to the coils 58 to provide power to the coils 58. Any number of power contacts 66 could be utilized to power any number of coils 58. Any suitable connection can be utilized to connect the power output contact 66 and the coils 58. Furthermore, at least one wire (not shown) extends between the circuit board 64 and each of the power output contacts 66 for electrically connecting the circuit board 64 and the power output contacts 66. The lead frame 62 also includes connection interface 68 for establishing an electrical connection between the printed circuit board 64 and an external control module, such as a transmission control module (TCM) or a powertrain control module (PCM) for transmitting data to the PCB 64 and to power the PCB 64. Additionally, the lead frame 62 includes a plastic encapsulation or casing 70 that is disposed about the PCB 64 and the electronics for protecting the PCB 64 and the electronics for allowing the lead frame 62 to be submerged in automatic transmission fluid (ATF) and operate in −40 C to +140 C temperatures. It should be appreciated that the aforementioned configuration of the lead frame 62 and associated components provide a low-cost, modular solution that provides for a more simplified manufacturing process and assembly.

Figures 3, 3A, 3B:
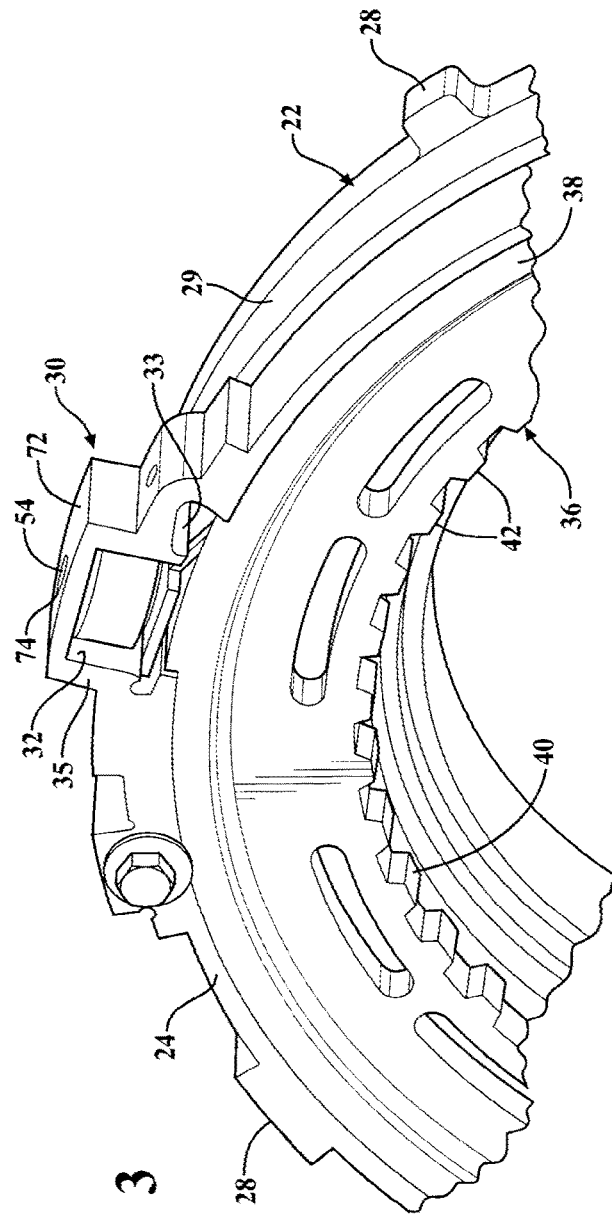
FIG. 3 is an assembled partial perspective view of the clutch assembly of FIG. 1 showing an arrangement for installing an electromagnetic actuator associated with the electromagnetic actuator module in an axially directed configuration.
FIGS. 3A and 3B are cross-sectional side views of the electromagnetic actuator of FIG. 3 with a strut of an active strut assembly shown in locked/deployed and unlocked/non-deployed positions, respectively, in response to respective energized and de-energized states of the electromagnetic actuator.

Referring to FIGS. 3, 3A and 3B, in an example embodiment of the protrusions 30, the open side surface 35 defines the actuator pocket 32 for axially receiving the coil assembly 52. Furthermore, a radially outwardly facing outer wall 72 of the protrusion 30 provides a through passage, also referred to simply as orifice 74, that extends radially inwardly into the actuator pocket 32. In this embodiment, coil 58 and bobbin 56 are axially disposed and press fit into the actuator pocket 32 through the open side surface 35. Once in position in the actuator pocket 32, which extends radially inwardly from the outer wall 72, the core 54 is pressed radially inwardly through the orifice 74 and through a central through passage of the bobbin 56 until it reaches a predetermined, preset location which sets the magnetic gap G between the armature 60 and the free end of the core 54. The core 54 attains a press fit against an inner surface 75 that defines and bounds the through passage of the bobbin 56, thereby being fixed against movement therein. The core 54 can further be press fit in the through passage of the bobbin 56, or configured in a clearance fit therein. FIG. 3A shows the active strut 50 in the locked position as a result of energization of the coil assembly 52 and FIG. 3B shows the active strut 50 in the unlocked position as a result of de-energizing the coil assembly 52.

Figure 4A:
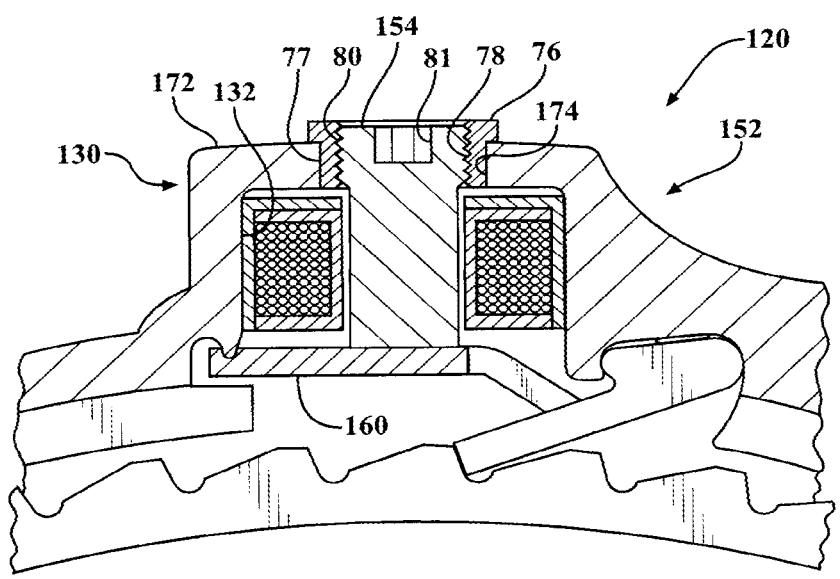
FIGS. 4A and 4B are similar views to FIGS. 3A and 3B showing an electromagnetic actuator constructed in accordance with another aspect of the present disclosure.
Figure 4B:
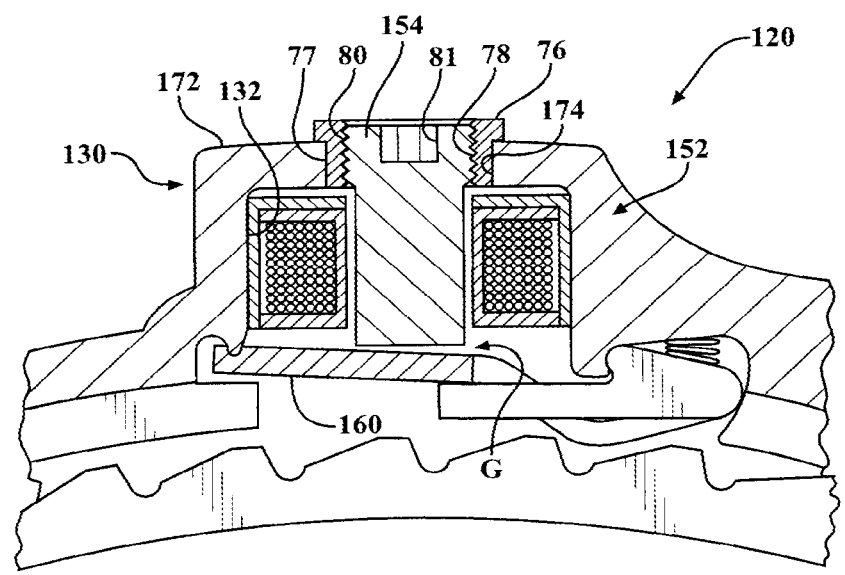

Referring to FIGS. 4A-4B, another example embodiment of a portion of a clutch assembly 120, similar to that discussed above with regard to FIGS. 3, 3A and 3B, is shown, wherein the same reference numerals, offset by a factor of 100, are used to identify like features. The coil assembly 152 is axially disposed and press fit into the respective actuator pockets 132, as discussed above. However, rather than directly fixing and press fitting the core 154 into an orifice 174 in an outer wall 172 of the protrusion 130, the core 154 is operably fixed in the orifice 174 in the outer wall 172 via a hollow adaptor plug, also referred to as nut 76. The nut 76 is first fixed in the orifice 174 of the protrusion, and then, the core 154 is disposed through the nut 76 and fixed thereto, whereupon the core 154 is readily adjusted to provide the desired gap G between the free end of the core 154 and the armature 160. The nut 76 is provided having an outer surface 77 configured for fixation within the orifice 174, such as via at least one of press fit, bonding agent, weld joint, threaded engagement, or other suitable mechanical and/or adhesion fixation mechanism.

The nut 76 further includes a threaded through passage 78 configured for threaded engagement with an externally threaded portion 80 of the core 154, shown as a threaded fastener end portion 80. To facilitate threading the core 154 into the nut 76, the fastener end portion 80 can be provided with a tool receptacle pocket 81, wherein the pocket 81 can be configured for engagement with any standard tool drive feature, as is known in the art of fasteners. When threading the core 154 into engagement with the nut 76, the gap G between the free end of the core 154 and the armature 160 can be precisely set, as desired, such as by threading the free end of the core 154 into abutment with the armature 160, and then reverse threading and backing the core 154 radially away from the armature 160 a set distance, which can be readily derived by knowing the pitch angle of the threads on the nut 76 and core 154, by way of example and without limitation. Upon fixing the core 154 in position, the core 154 can remain free from direct attachment with the coil 158 and bobbin 156, and thus, is disposed in a clearance fit therewith, which in turn allows for readily simple adjustment and replacement of the core 154 as desired without effect on either the coil 158 or bobbin 156.

Figure 5:
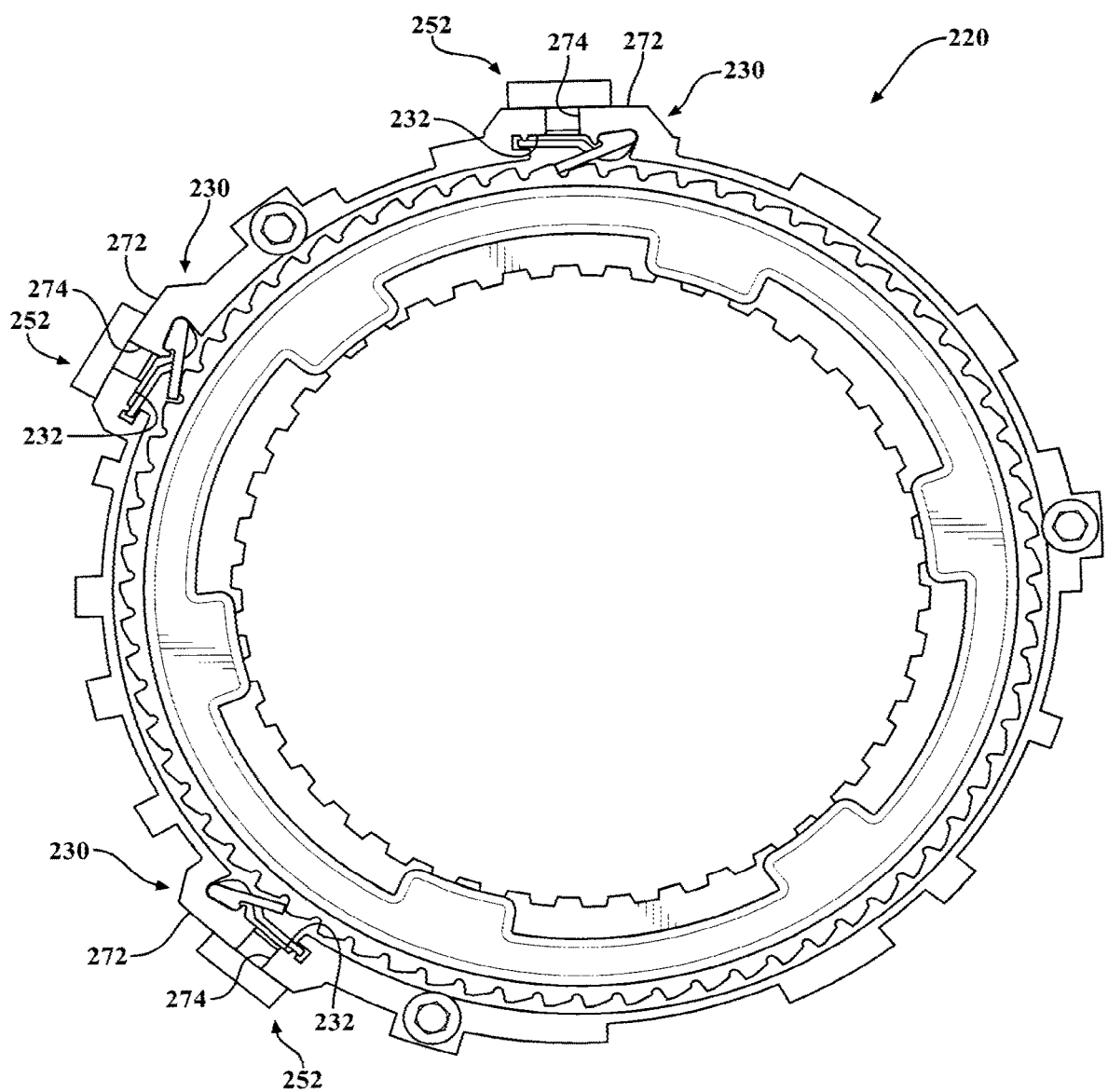
FIG. 5 illustrates a clutch assembly having a selectable one-way coupling device with a press-fit electromagnetic actuator associated with the active strut assembly in accordance with another aspect of the present disclosure.
Figure 5A:
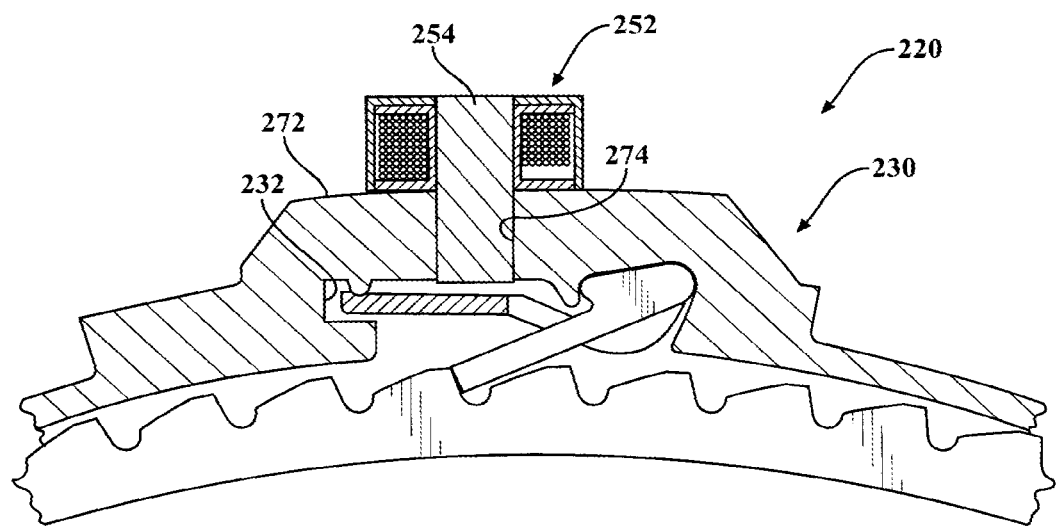
FIG. 5A is an enlarged partial cross-sectional view of FIG. 5 illustrating an orifice formed in the outer race housing configured to receive the radially pressed electromagnetic actuator in accordance with one aspect of the present disclosure.
Figure 5B:
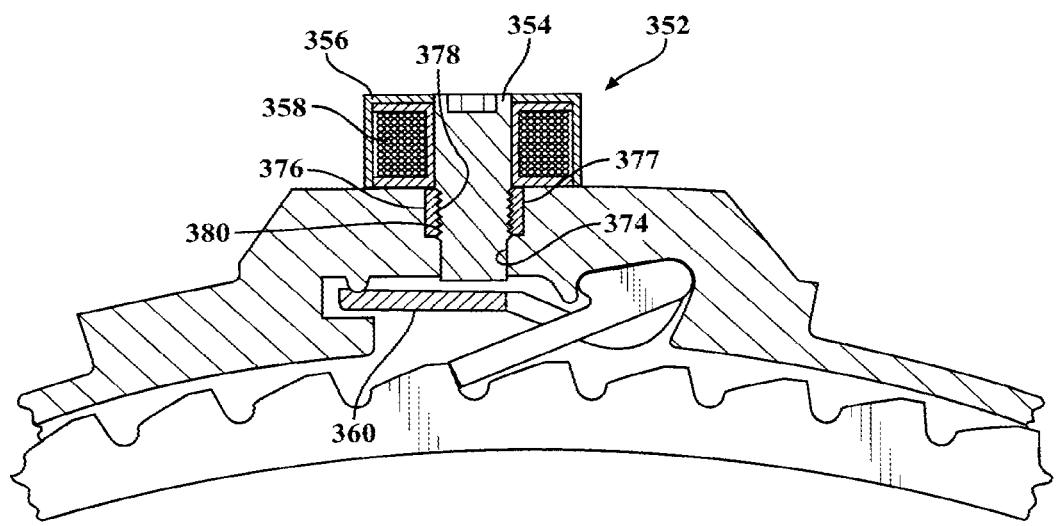
FIG. 5B is a view similar to FIG. 5A showing an electromagnetic actuator assembled to the outer race housing in accordance with another aspect of the present disclosure.

Referring to FIGS. 5 and 5A, another example embodiment of a clutch assembly 220 is shown, wherein the same reference numerals, offset by a factor of 200, are used to identify like features. In this embodiment, an orifice 274 extends directly through the outer wall 272 of the protrusion 230 to the actuator pocket 232, wherein the orifice 274 is configured to receive the core 254 of the coil assembly 252 radially therein. The core 254 of the coil assembly 252 is pressed radially inwardly into the orifice 274 and fixed therein. As a result of the core 254 being fixed in the orifice 274, the entire coil assembly 252 is fixed in place without having access an inner portion of the protrusion 230. In the embodiment shown, the core 254 is sized for a press fit, also known as an interference fit, within the orifice 274, wherein it should be recognized that other mechanisms for fixing the core 254 in the orifice 274, other than press fit, are contemplated herein, such as discussed above with reference to adhesives, weld joints, mechanical fasteners and the like. Further, as shown in FIG. 5B, another example embodiment, similar to that discussed above with regard to FIGS. 4A and 4B, is shown, wherein the same reference numerals, offset by a factor of 300, are used to identify like features. Rather than fixing the core 354 in direct contact with the orifice 374 in the outer wall 372, a nut 376 can be used to facilitate fixing the core 354 of the coil assembly 352 in a precise setting relative to the armature 360, thereby establishing a precise gap G therebetween, as desired. The nut 376 is provided having an outer surface 377 configured for fixation within the orifice 374, such as via at least one of press fit, bonding agent, weld joint, threaded engagement, or other suitable mechanical and/or adhesion fixation mechanism. The nut 376 further includes a threaded through passage 378 configured for threaded engagement with an externally threaded portion 380 of the core 354, shown as a portion immediately adjacent the radially outwardly extending bobbin 356 and coil 358. When threading the core 354 into engagement with the nut 376, the gap G between the free end of the core 354 and the armature 360 can be precisely set, as discussed above with regard to FIGS. 4A and 4B. Upon fixing the core 354 within the nut 376, it is to be recognized that other than the core 354, the remaining portion of the coil assembly 352 remains external to the protrusion 312, and thus, can be freely accessed when desired, such that servicing the coil assembly 352 is made easy.

Figure 6:
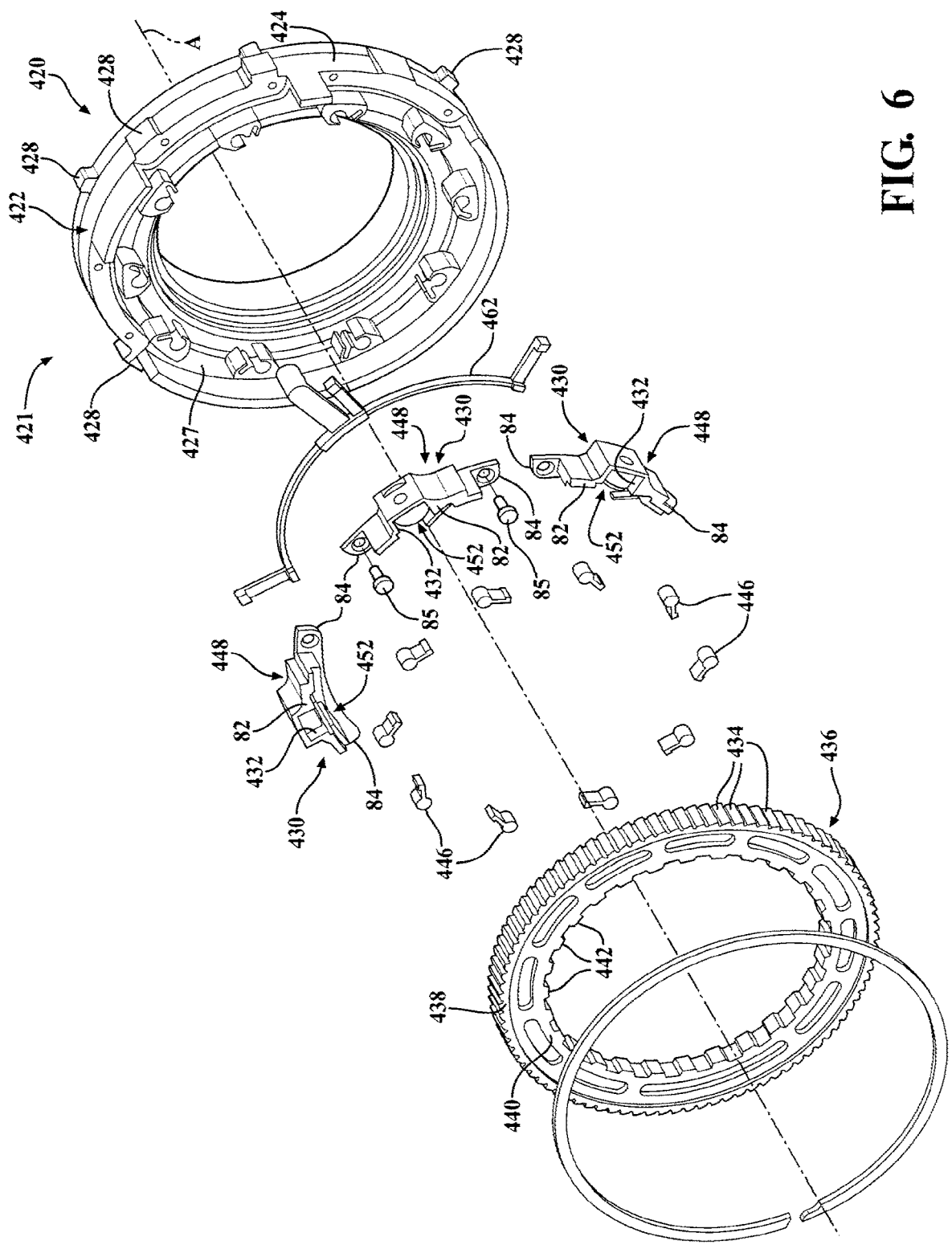
FIG. 6 is an exploded perspective view of a bi-directional clutch assembly having an electromagnetic actuator module configured to include a modular active strut arrangement for a selectable one-way coupling device in accordance with another aspect of the present disclosure.
Figure 7:
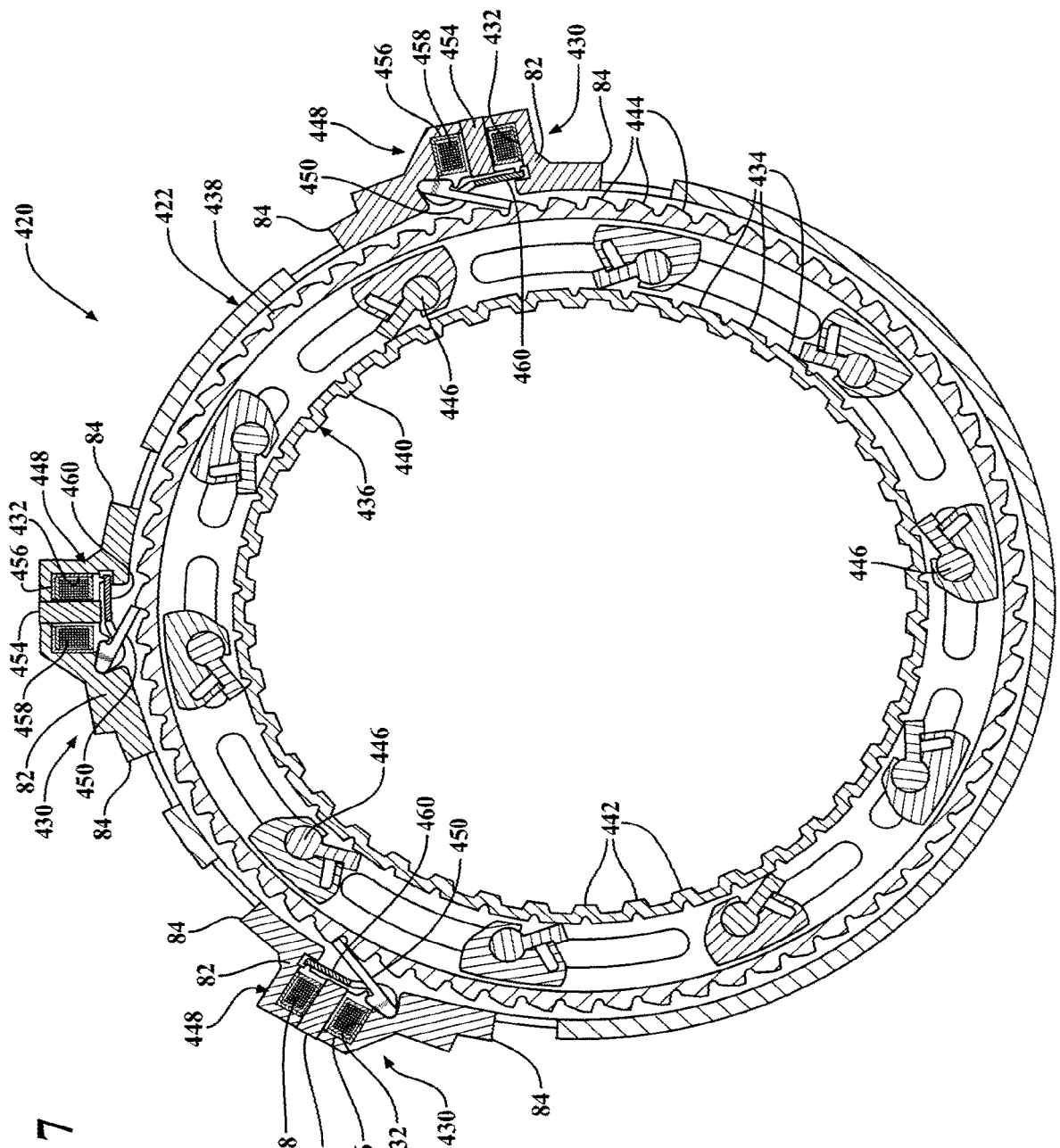
FIG. 7 is a cross-sectional side view of the bi-directional clutch assembly shown in FIG. 6.

Referring to FIGS. 6 and 7, wherein like numerals indicate corresponding parts throughout the several views, offset by a factor of 400, a clutch assembly 420 is generally shown. The clutch assembly 420 includes a clutch module 421 having an outer race 422 that extends annularly about an axis A. The outer race 422 includes an outer ring 424 that presents a plurality of outer lugs 428 that extend radially outwardly for mating with a first component. The first component can be a stationary component (such as a housing of a transmission) or a rotary component (such as a shaft). The outer race 422 further has an axially facing web or face 427 that has an annular shape that extends radially inwardly from the outer ring 424. A plurality of passive struts 446 are pivotally connected to the axial face 427. A biasing spring (not shown) engages each of the passive struts 446 for biasing the passive struts 446 into a locked position toward an inner race 436 associated with the clutch module 421.

The inner race 436 extends annularly about the axis A. The inner race 436 has an outside rim or band 438 and an inside rim or band 440 that are spaced radially from one another on opposing sides of the passive struts 446. The inside band 440 of the inner race 436 presents a plurality of inner lugs 442 that extend radially inwardly therefrom for mating with a second component (typically a rotary component). The inside band 440 of the inner race 436 further presents a plurality of passive teeth 434 that extend radially outwardly therefrom for being engaged by the passive struts 446 for locking the inner and outer races 436, 422 to one another in response to counter-clockwise rotation of the inner race 436 relative to the outer race 422. The outside band 438 of the inner race 436 presents a plurality of active teeth 444 that extend radially outwardly therefrom and are evenly distributed about the axis A.

The electromagnetic actuator module 423 of clutch assembly 420 includes a plurality of "modular" active strut assemblies 448 that are axially connected to the outer race 422. Each of the active strut assemblies 448 includes a generally arc shaped protrusion 430, wherein the protrusion 430 is constructed as separate piece of material from the outer race 422. Each protrusion 430 includes a base 82 and a pair of circumferentially extending flanges 84 that extend from the base 82 on opposing sides of the base 82. A fastener 85, e.g., a bolt, extends axially through a through opening in each of the flanges 84 and is fastened to the outer race 422 for securing the active strut assemblies 448 to the outer race 422. The active strut assemblies 448 are arranged in circumferential alignment with one another about the axis A, as desired.

An actuator pocket 432 extends axially into the base 82 of each of the active strut assemblies 448. A coil assembly 452 is disposed in each of the actuator pockets 432. The coil assembly 452 includes a core 454 of a magnetically permeable material, a bobbin 456 configured for receipt about the core 454, and a coil 458 wrapped about the bobbin 456. It should be appreciated that the bobbins 456 and coils 458 of the coil assemblies 452 can advantageously be easily fitted into their respective pockets 432 for easy installation.

Each of the active strut assemblies 448 includes an active strut 450 that is selectively pivotal between a locked and an unlocked position, as discussed above. In the locked position, the active struts 450 engage the active teeth 444 of the inner race 436, therefore locking the outer and inner races 422, 436 to one another during clockwise movement of the inner race 436 relative to the outer race 422. However, the active struts 450 allow relative displacement (i.e., overrun) in the counter-clockwise direction. In the unlocked position, the active struts 450 are radially spaced from the active teeth 444, allowing the outer and inner races 422, 436 to rotate relative to one another.

The plurality of passive struts 446 are pivotal between a locking position and an unlocking position. In the locking position, the passive struts 446 engage the passive teeth 434 of the outer race 422 for connecting the outer and inner races 422, 436 to one another during counter-clockwise rotation of the inner race 436 relative to the outer race 422. Therefore, engagement by the passive struts 446 prevents relative displacement of the outer and inner races 422, 436 in the counter-clockwise direction, however, the passive struts 446 allow relative displacement, i.e., overrun, in the clockwise direction. In the unlocking position, the passive struts 446 are radially space from the passive teeth 434 of the outer race 422, thereby allowing counter-clockwise rotation of the inner race 436 relative to the outer race 422.

Each of the active strut assemblies 448 further includes an armature 460 disposed between the active strut 450 and the core 454 for providing the pivotal movement of the active strut 450 in response to energization of the coil 458. A lead frame 462, such as discussed above with regard to FIGS. 1 and 2, electrically connects the coils 458 to one another for energizing the coils 458 to actuate and pivot the active struts 450 to their engaged, locked positions.

Accordingly, it should be appreciated that the modular configuration of the electromagnetic actuators allows the active strut assemblies/coil assemblies 448, 452 to be manufactured separately from the rest of the clutch assembly 420. Further, it should be appreciated that any number of the active strut assemblies/coil assemblies 448, 452 could be installed on any given clutch assembly 420 as needed to provide a needed amount of torque. Additionally, it should be appreciated that the modular active strut assemblies as described herein could be utilized on various other clutch assembly configurations.

It should be appreciated that being able to axially or radially load the coil assemblies 52, 152, 252, 352, 452 discussed above provides for a simple manufacturing assembly step and allows the coil assembly 52, 152, 252, 352, 452 to be assembled before being installed into the respective actuator pocket 32, 132, 232, 332, 432. It should further be appreciated that the aforementioned axially and radially loading pockets/protrusions could be utilized on other clutch assembly configurations.

Figure 8:
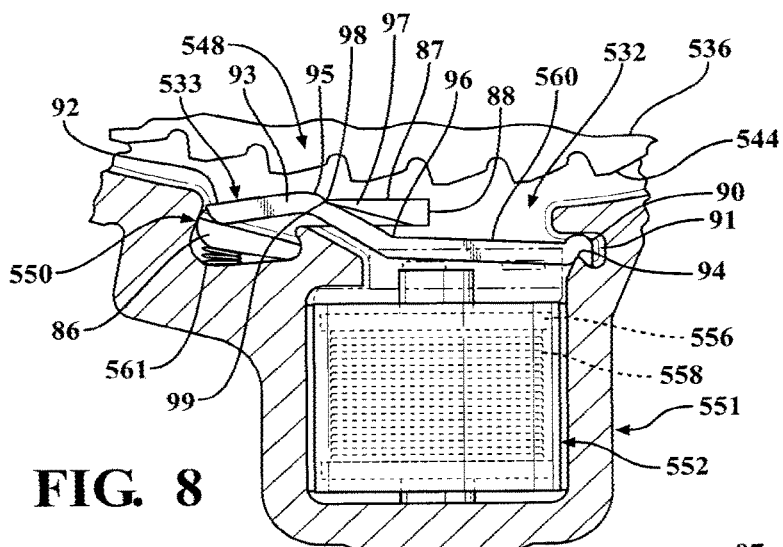
FIG. 8 is an enlarged partial side view of an active strut assembly adapted for use with the selectable one-way coupling device associated with the bi-directional clutch assemblies of FIG. 1 and configured to provide a high inertia load resistance arrangement in accordance with the present disclosure and illustrating the active strut in an unlocked/non-deployed position when an electromagnetic actuator is non-energized.
Figure 9:
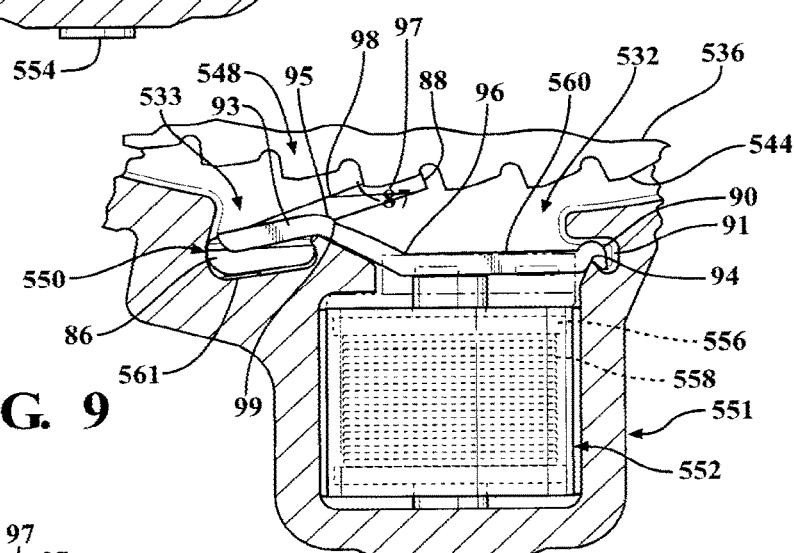
FIG. 9 is similar to FIG. 8 illustrating the active strut located in a locked/deployed position in response to energization of the electromagnetic actuator.
Figure 10:
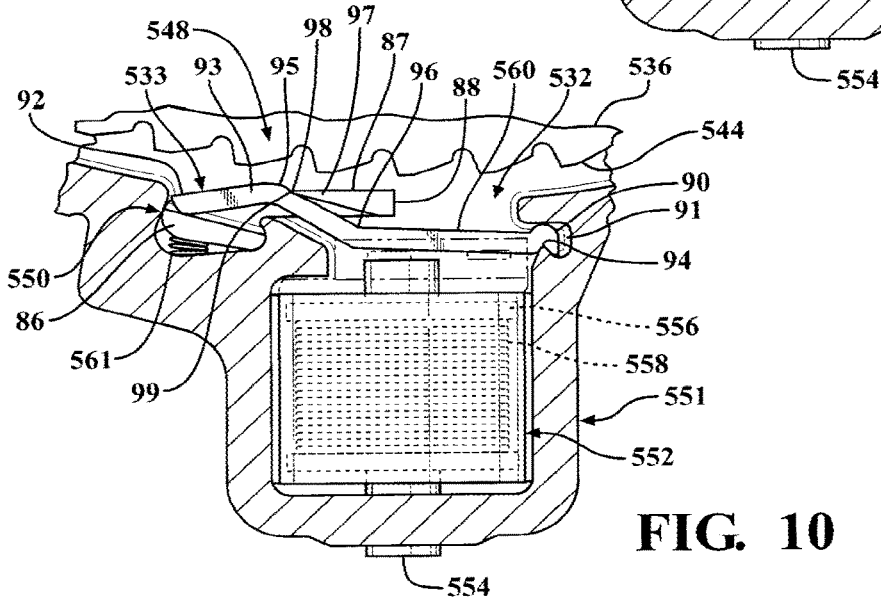
FIG. 10 is similar to FIG. 8 illustrating the inertia load resistance arrangement positively holding the active strut in its unlocked/non-deployed position upon application of a radially directed high inertial load.
Figure 11:
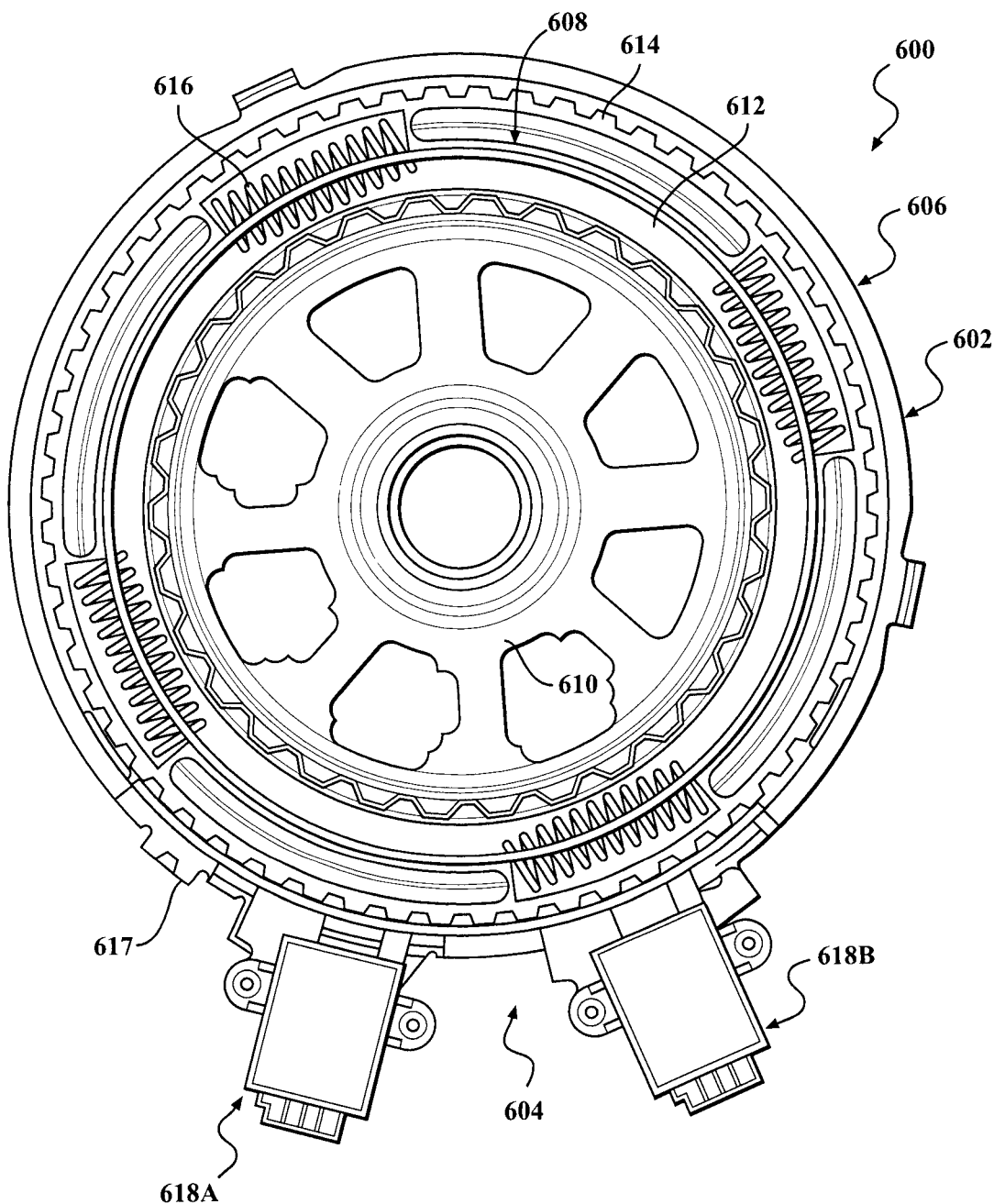
FIG. 11 is a side view of a clutch assembly constructed in accordance with another aspect of the present disclosure having a clutch module and an electromagnetic actuator module providing bi-directional freewheeling and lockup functionality.
Figure 12:
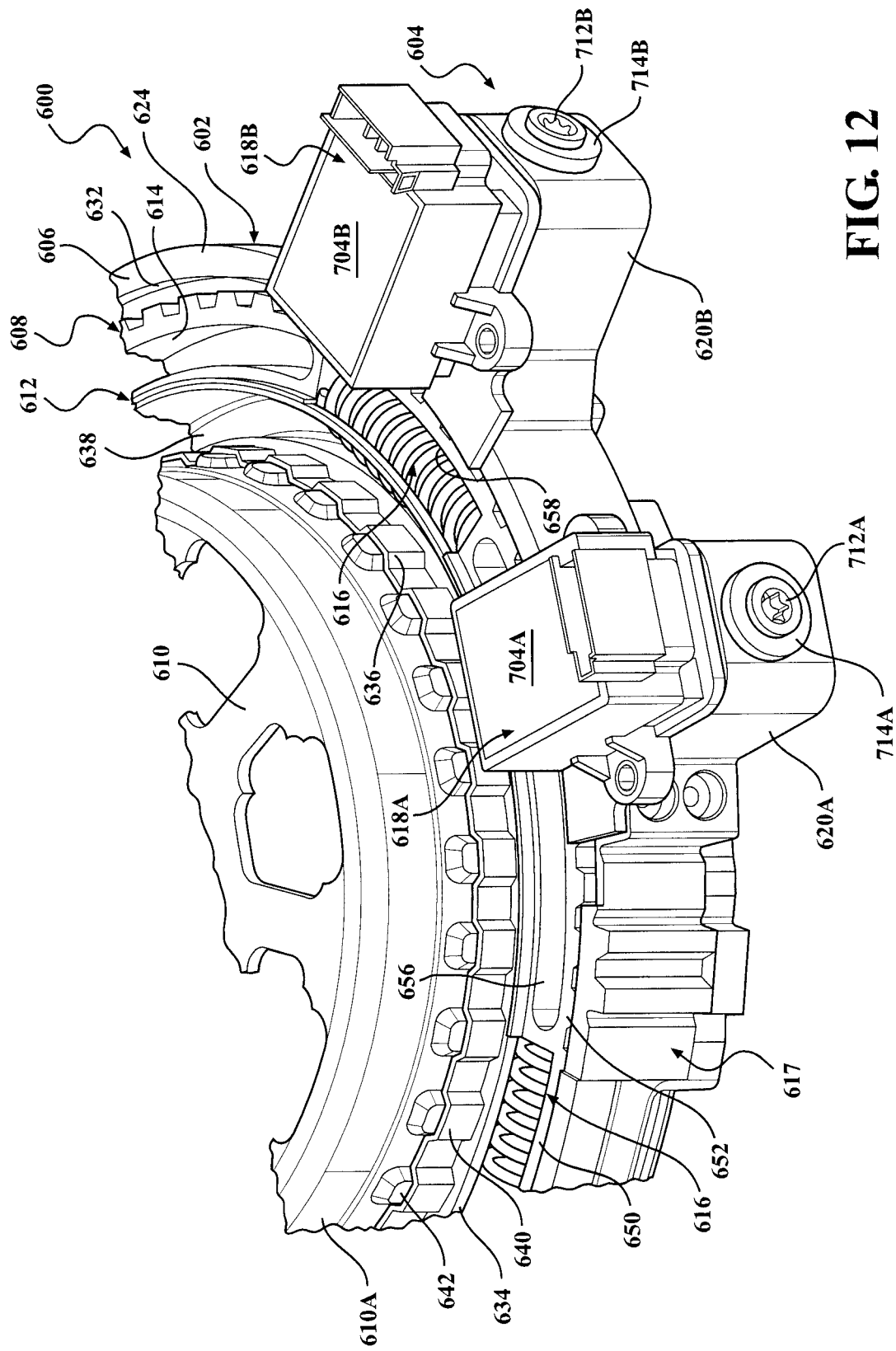
FIG. 12 is a partial assembled view of the clutch assembly of FIG. 11 showing components of the clutch module and the electromagnetic actuator module in greater detail.

Referring to FIGS. 8-10, wherein like numerals indicate corresponding parts throughout the several views, offset by a factor of 500, an active strut assembly 548, which can be incorporated in any of the clutch assembly embodiments discussed herein, as well as others, as will be readily apparent to one skilled in the art, is received in a strut pocket 533 of the outer race 522. Each of the active strut assemblies 548 is operable via actuation of an electromagnetic actuator 551 having a coil assembly 552, an armature 560, a biasing spring 561, and an active strut 550.

The active strut 550 includes a base segment 86 and a locking arm 87. The locking arm 87 extends from the base segment 86 to a locking end or edge 88. The base segment 86 is pivotally disposed in the strut pocket 533 for pivoting movement between a locked position (FIG. 9) and an unlocked position (FIGS. 8 and 10). In the locked position, the locking edge 88 engages the outer ratchet teeth 544 of the inner race 536, and in the unlocked position, the locking edges 88 are radially spaced from the outer ratchet teeth 544 of the inner race 536. The biasing spring 561 is disposed in the strut pocket 533 and extends between the base segment 86 and a base or floor of the strut pocket 533 for biasing the strut 550 toward the unlocked position.

The coil assembly 552 includes a core 554 of a magnetically permeable material that is disposed through a central passage of a bobbin 556, with at least one coil 558 being wrapped directly onto the bobbin 556, and thus, operably about the core 554 for focusing the magnetic flux produced by the coil 558 about the core 554.

The armature 560 extends between a first end 90 that is seated in an armature section 91 of the actuator pocket 532 for pivotal movement therein and a second end 92 that extends into the strut pocket 533 into engagement with the base 86 of the strut 550. The armature 560 is shown as having bifurcated legs 93 forming a channel therebetween, wherein the channel is sized for clearance receipt of a reduced width section of the strut 550 therein, with each leg 93 extends along opposite sides of the strut 550. The first end 90 of the armature 560 is pivotally disposed about a pivot rail 94 in the armature section 91 of the pocket 532 for pivoting radially toward and away from the core 554, in response to energization of the coil 558, between an actuated position and a non-actuated position. In the actuated position, the armature 560 is drawn toward the core 554, whereupon the legs 93 drive the strut 550 into the locked position via engagement with the base segment 86. In the non-actuated position, the armature 560 is spaced from the core 554 and allows the biasing spring 561 to bias the strut 550 into the unlocked position. The armature 560 presents an upper bend 95 in each leg 92 and a lower bend 96 adjacent an attachment region of the legs 92, such that the upper and lower bends 95, 96 are between the first end 90 and the second end 92.

It is important, especially when the clutch assembly 520 is utilized on automotive components, for the struts 550 to only engage the outer ratchet teeth 544 of the inner race 536 when then coil assembly 552 is energized to intentionally move the struts 550 to the locked position. Therefore, resistance to inertia loading (high g-force in certain directions other than simple gravity) is important for the operation of the clutch assembly 520. The most common method of resisting high inertia loading is to utilize a higher force biasing spring 561. While this method is a quick fix, there are disadvantages associated therewith. One of the disadvantages is the increased resistance provided by the biasing spring 561 during normal operation, which requires the armature 560 and/or coil assembly 552 to be increased in size and thickness to produce the necessary increased magnetic forces to overcome the increase in spring force imparted by the larger spring 561. To accommodate such larger components, the pockets 532, 533 may also need to be larger, thereby increasing the overall size and weight of the clutch assembly 520.

As an alternative solution to increasing the size of the aforementioned components/assemblies, the generally central portion of the strut 550 that extends between the legs 93 of the armature 560 includes a projections 97 that have a generally triangular shaped cross-section that extends lengthwise along a portion of the locking arm 87, with the projections 97 extending outwardly from the central portion of the locking arm 87 away from one another into overlying relation with a respective leg 93. Each of the projections 97 converges and terminates at a generally sharp edge 98. Further, a shoulder 99 is defined by or provided adjacent the upper bend 95 in the legs 92 of the armature 560. The shoulders 99 are configured to be engaged by the edges 98 of the projections 97 of the strut 550 for restricting the strut 550 against movement toward the locked direction, unless otherwise actuated via energization of the coil assembly 552. Thus, during the application of inertial forces, the purposeful engagement of the projections 97 with the shoulders 99 causes the strut 550 to stop rotating upwardly, thereby preventing engagement of the outer ratchet teeth 544 of the inner race 536 with the locking edge 88 of the strut 550 (as best shown in FIG. 10).

FIG. 8 presents a non-energized condition of the coil 558, with the armature 560 located in the non-actuated position and the strut 550 located in the unlocked position. Further, FIG. 9 presents an energized condition of the coil 558, causing the armature 560 to move to the actuated position and forcibly pivot the strut 550 to the locked position, as intended. FIG. 10 shows the situation in which a high inertial load is applied to the clutch assembly 520 in the radial inward direction (as shown by the arrow). In this situation the armature 560 rotates clockwise slightly under the inertial load, however, the strut 550 is blocked and prevented from rotating counter-clockwise any further due to the intentional interference established between the abutting shoulder 99 of the armature 560 and the locking edges 98 of the projections 97. Therefore, the interference between the edges 88 of the projections 97 and the shoulders 99 of the armature 560 greatly increase the force required to move the strut 550 against the outer ratchet teeth 544 of the inner race 536, but doesn't increase the amount of load required by the armature 560/coil assembly 552 to pivot the strut 550, as commanded and intended.

It should be appreciated that the projections 97 of the struts 550 and shoulders 99 of the armature 560 could be utilized on other active strut assembly configurations to resist high inertia loading.

In each of the above embodiments of the clutch assembly, a passive one-way coupling device was shown in combination with a selectable one-way coupling device. However, those skilled in the art will appreciate that various alternative configurations for the active strut assemblies and electromagnetic actuators (i.e. the electromagnetic actuator module) can be used in any suitable radial or axial selectable one-way coupling device arranged to provide a single direction power-locking mode or a dual-direction power locking mode. Additionally, the armatures can be secured to a linearly-moveable actuation member of a solenoid-type electromagnetic actuator for likewise controlling movement of the active strut relative to ratchet teeth.

Referring now to FIGS. 11 through 15, a first non-limiting embodiment of a dual-acting selectable one-way coupling (SOWC) device 600 is shown to generally include a clutch module 602 and an electromagnetic actuator module 604. Clutch module 602 includes a first clutch component and a second clutch component. The first clutch component is configured as an outer race 606 adapted to be rigidly secured to a non-rotatable portion of the transmission, such as the transmission housing. The second clutch component is configured as an inner race assembly 608 adapted to be drivingly connected for rotation with a rotary component of the transmission, such as a drive hub 610. More specifically, inner race assembly 608 includes a first inner race member 612, a second inner race member 614, and a plurality of compressible connector members 616 arranged to drivingly interconnect second inner race member 614 to first inner race member 616, the function and structure of which will be detailed hereinafter. Inner race assembly 608 is arranged radially with respect to outer race 606 for rotation about a central axis. Electromagnetic actuator module 604 includes an actuator frame 617 adapted to be secured to outer race 607, a first electromagnetic actuator assembly 618A mounted within a first actuator support section 620A of actuator frame 617, and a second electromagnetic actuator assembly 618B mounted within a second actuator support section 620B of actuator frame 617. As will be detailed, first electromagnetic actuator assembly 618A is operable in a lockup mode to lock inner race assembly 608 against rotation relative to outer race 606 in a first rotary direction while second electromagnetic actuator assembly 618B is operable in a lockup mode to lock inner race assembly 608 against rotation relative to outer race 606 in a second rotary direction.

Figure 13:
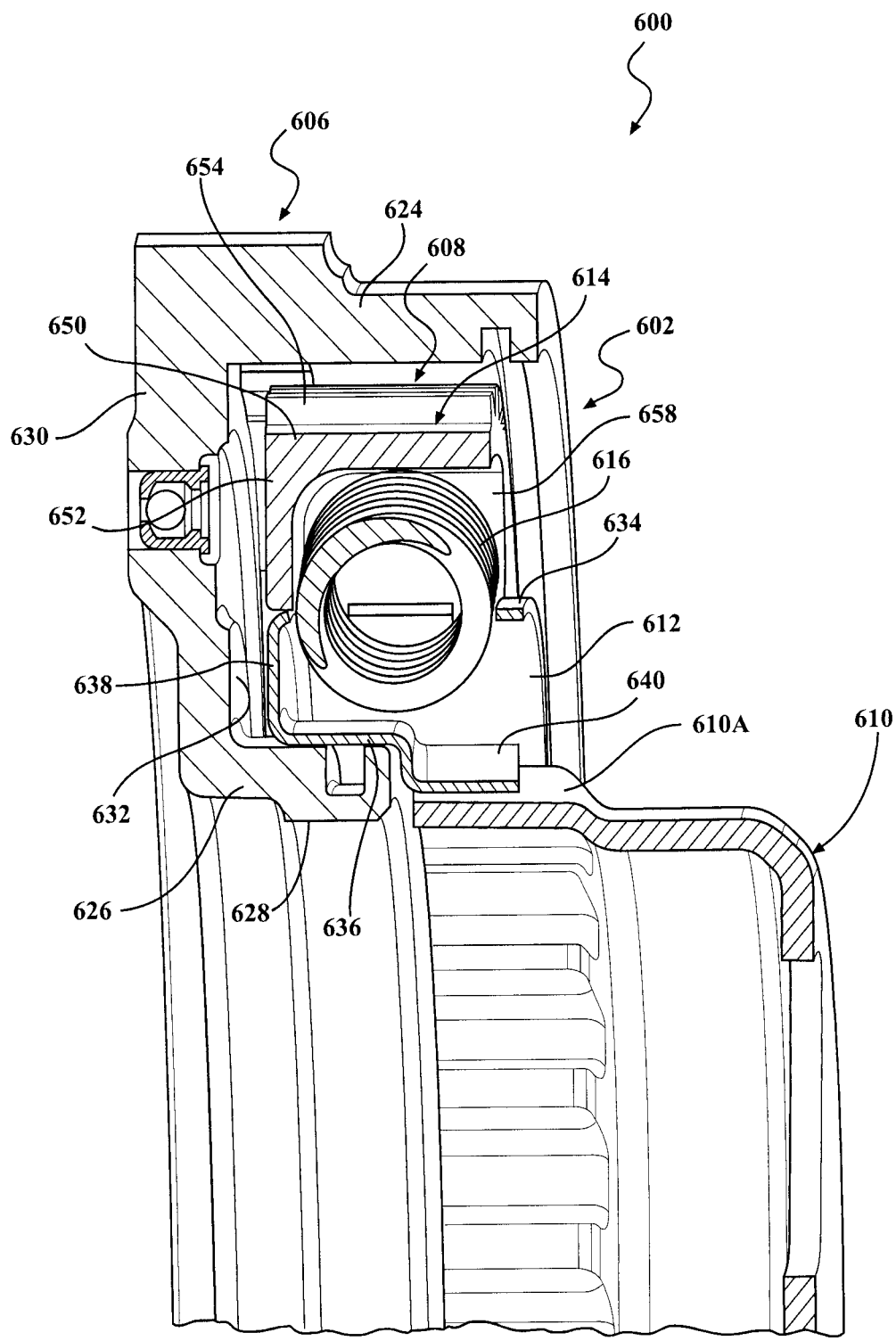
FIG. 13 is a partial sectional view of the clutch module.
Figure 14:
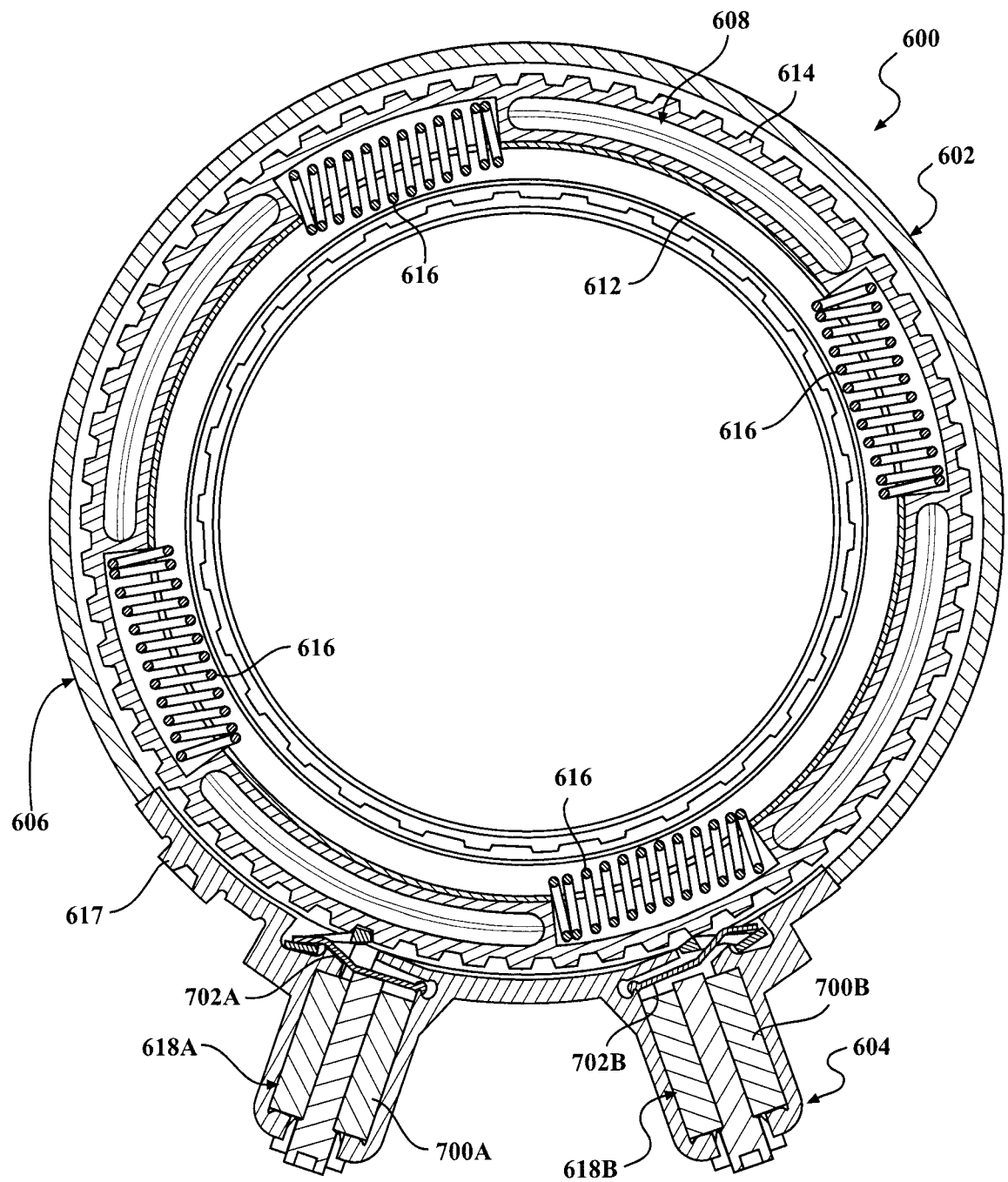
FIG. 14 is a sectional view of the clutch assembly shown in FIG. 11 illustrating the electromagnetic actuators of the electromagnetic actuator module arranged to provide the bi-directional functionality.

Outer race 606 is a structural component and, as best shown in FIG. 13, is configured to include a cylindrical outer rim 624, a cylindrical inner rim 626 defining a central aperture 628, and a radial plate segment 630 interconnecting outer rim 624 to inner rim 626 so as to define an annular inner race cavity 632 within which inner race assembly 608 is rotatably disposed. First inner race member 612 of inner race assembly 608 is preferably a stamped sheet metal component having an outer cylindrical flange segment 634, an inner cylindrical flange segment 636, and a radial web segment 638 interconnecting outer flange segment 634 to inner flange segment 636. Coupling features, such as splines 640, are formed on inner flange segment 636 and are configured to drivingly engage corresponding splines 642 formed on a rim segment 610A of drive hub 610. As will be detailed, a portion of inner flange segment 636 on first inner race member 612 is rotatably supported on, or in close proximity to, inner rim 626 of outer race 606. Second inner race member 614 is preferably a powder metal component configured to include an outer cylindrical lip segment 650 and a radial ring segment 652. Radially-extending locking features, hereinafter outer ratchet teeth 654, are formed on the outer surface of outer lip segment 650 and encircle the entire periphery thereof. A plurality of alternating arcuate grooves 656 and driven pockets 658 are formed in ring segment 652 which, in the non-limiting example shown best in FIGS. 11 and 14, include a plurality of four (4) such grooves 656 and pockets 658.

Compressible connector members 616 are shown, in the non-limiting example, to be compression springs, each being disposed within a corresponding one of driven pockets 658 in ring segment 652 of second inner race member 614. Compression springs 616 can be straight (as shown) or preformed to define a curved profile. In addition, each compression spring 616 is disposed within a driver window 660 formed in outer flange segment 636 of first inner race member 612. Driver windows 660 are aligned with driven pockets 658. The opposite ends of each compression spring 616 are retained in end slots formed in outer flange segment 634 at the opposite ends of driver windows 660. Thus, compression springs are torque-transmitting elements drivingly connecting first inner race member 612 to second inner race member 614 and which function to limit torque spikes and provide a damping effect during locking of inner race assembly 608 to outer race 606.

Actuator frame 617 of electromagnetic actuator module 604 is configured to be secured (i.e. bolted) to outer rim 624 of outer race 606. Each electromagnetic actuator assembly 678 includes an electromagnetic actuator 700, an active strut assembly 702, and a cover assembly 704. As best seen from FIGS. 14 and 15, an actuator chamber 706 is formed in each actuator support section 620 of actuator frame 617. Electromagnetic actuators 700 and active strut assemblies 702 can be similar to the configurations previously disclosed and described in reference to FIGS. 3-5 and 8-10 above. To this end, electromagnetic actuators 700 each include a coil assembly 710 mounted in actuator chamber 706, a core piece 712, and adjustment nut 714. Active strut assemblies 702 each include an active strut 720 supported in a strut chamber 722 formed in actuator frame 617 for movement between non-deployed/released and deployed/locked positions relative to ratchet teeth 654 on second inner race member 614 of inner race assembly 608. Each active strut assembly 702 also includes an armature 724 that is supported in an armature frame 617 formed in actuator housing 616 for movement between non-actuated and actuated positions. As previously noted, strut 720 is normally biased toward its non-deployed position and armature 724 is normally biased toward its non-actuated position, thereby permitting inner race assembly 608 to rotate relative to outer race 606 when coil assembly 710 is not energized. Energization of one of coil assemblies 710 causes movement of its corresponding armature 724 to its actuated position which, in turn, results in movement of the corresponding active strut 720 to its deployed position whereat it lockingly engages one of ratchet teeth 654.

Figure 15:
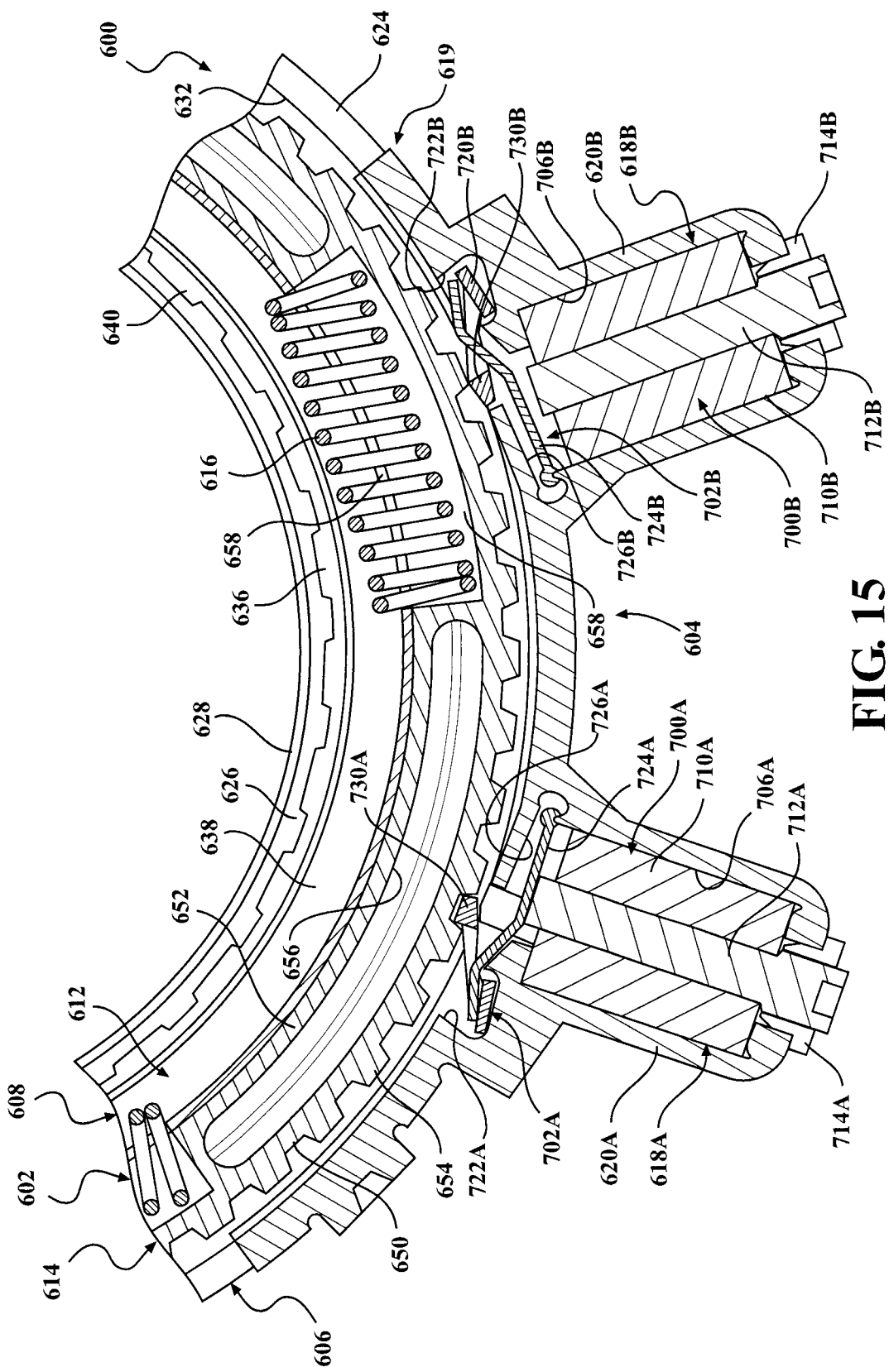
FIG. 15 is an enlarged partial view of FIG. 14 illustrating the components associated with the clutch module and the components associated with the pair of electromagnetic actuators.
Figure 16:
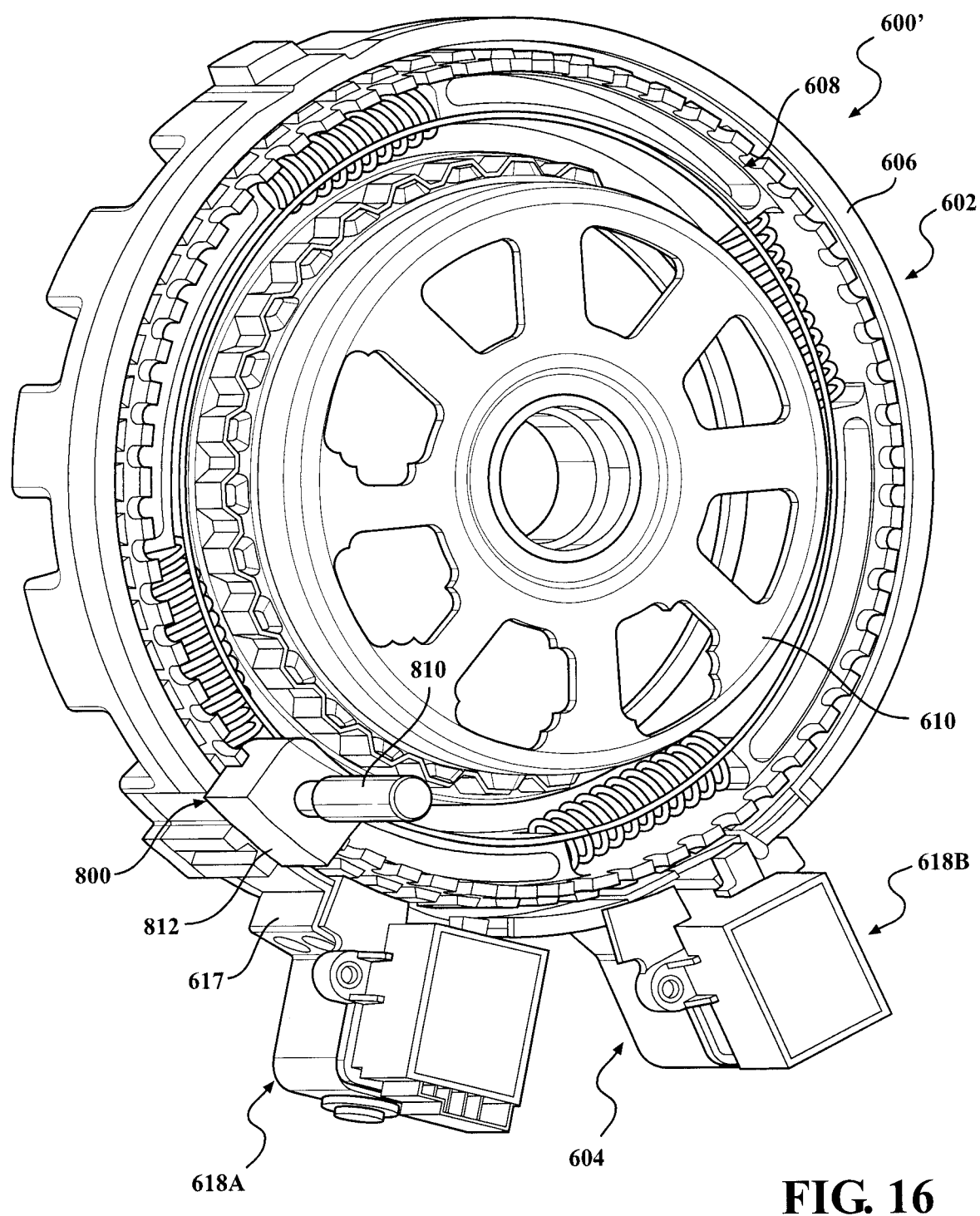
FIG. 16 illustrates an alternative embodiment of the clutch assembly shown in FIGS. 11-15 now equipped with an auxiliary locking assembly.
Figure 17:
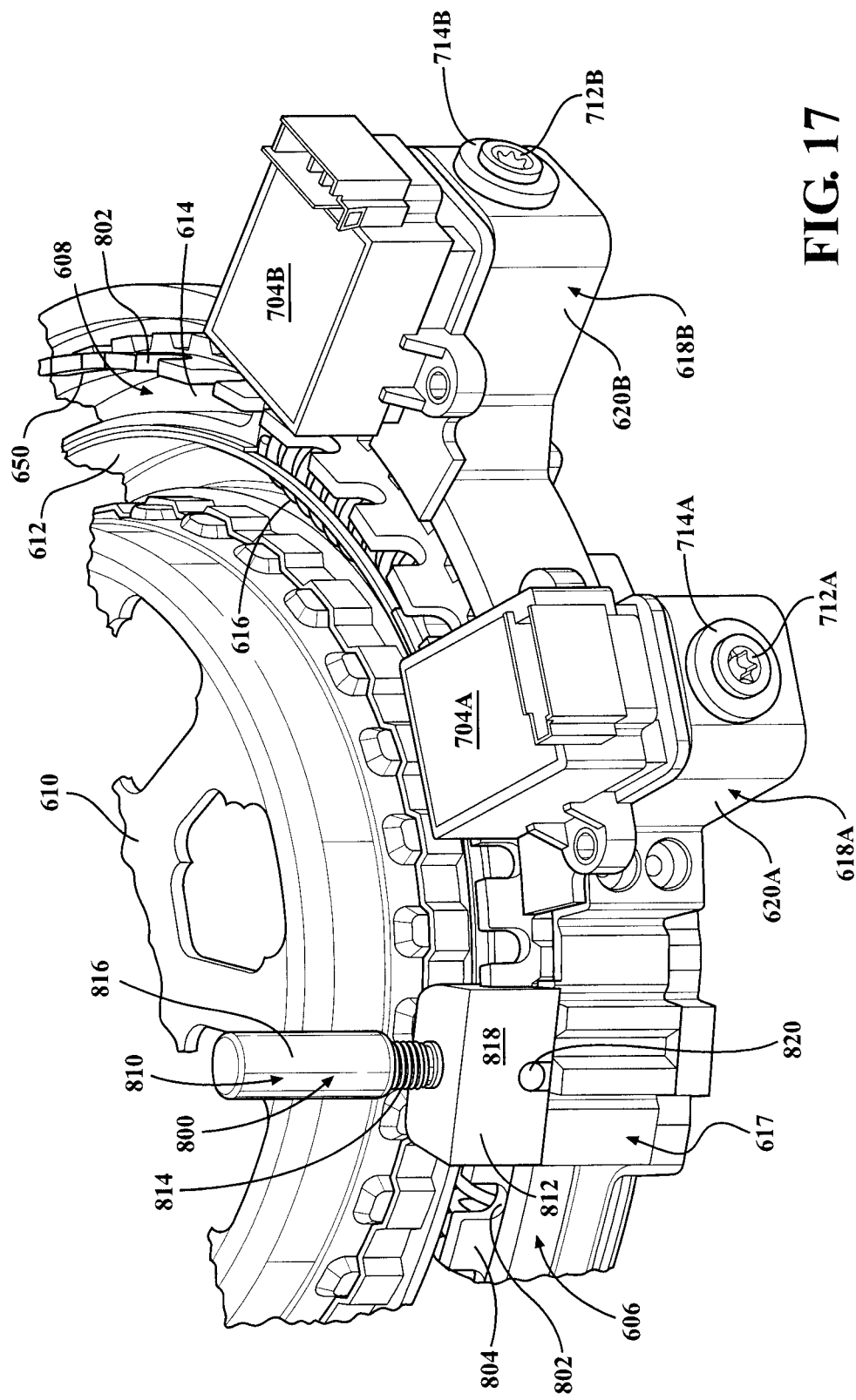
FIG. 17 is an enlarged, partial assembly view of the clutch assembly shown in FIG. 16.
Figure 18:
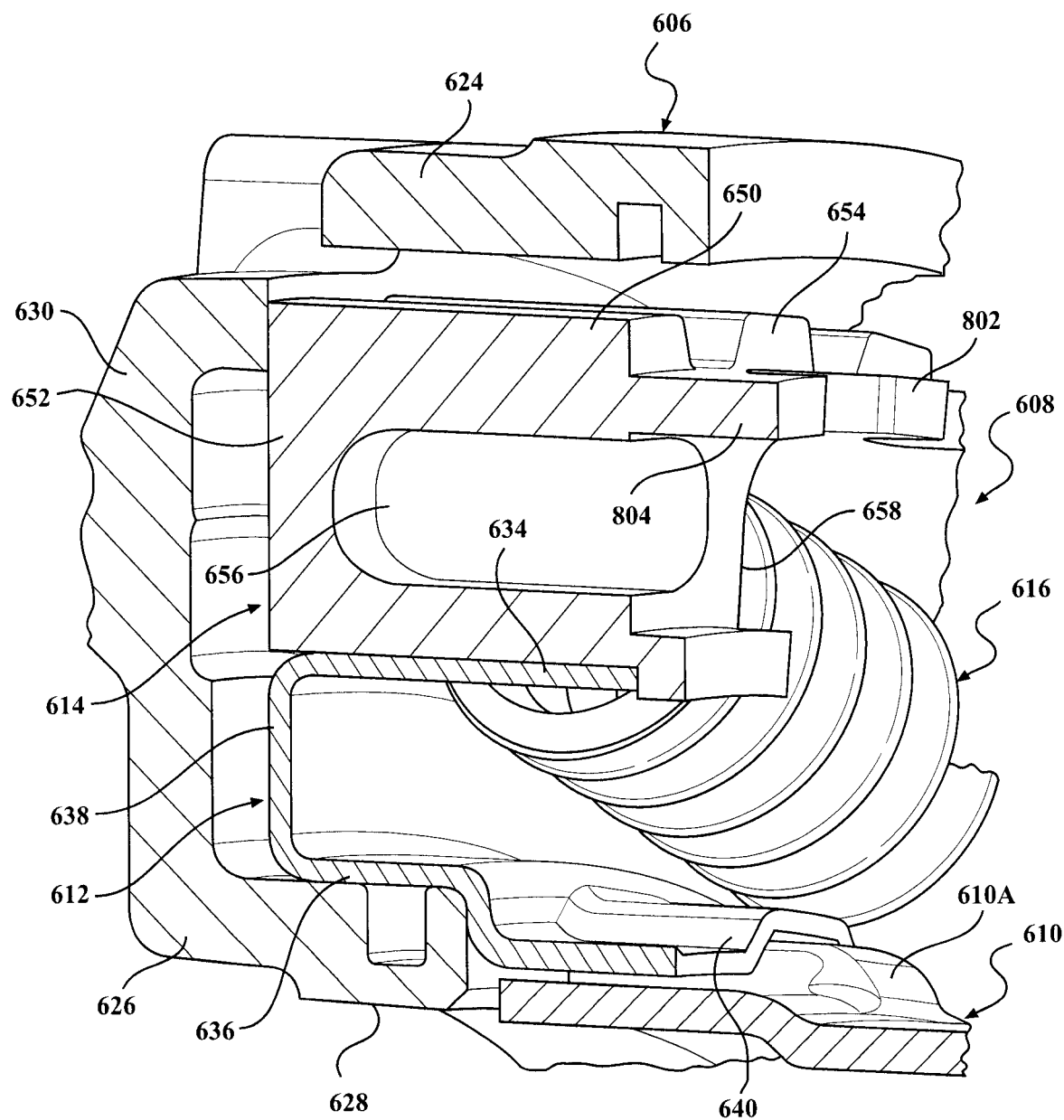
FIG. 18 is a partially-sectioned assembled view, similar to FIG. 13, but illustrating the supporting arrangement for the clutch module associated with the clutch assembly of FIG. 16.
Figure 19:
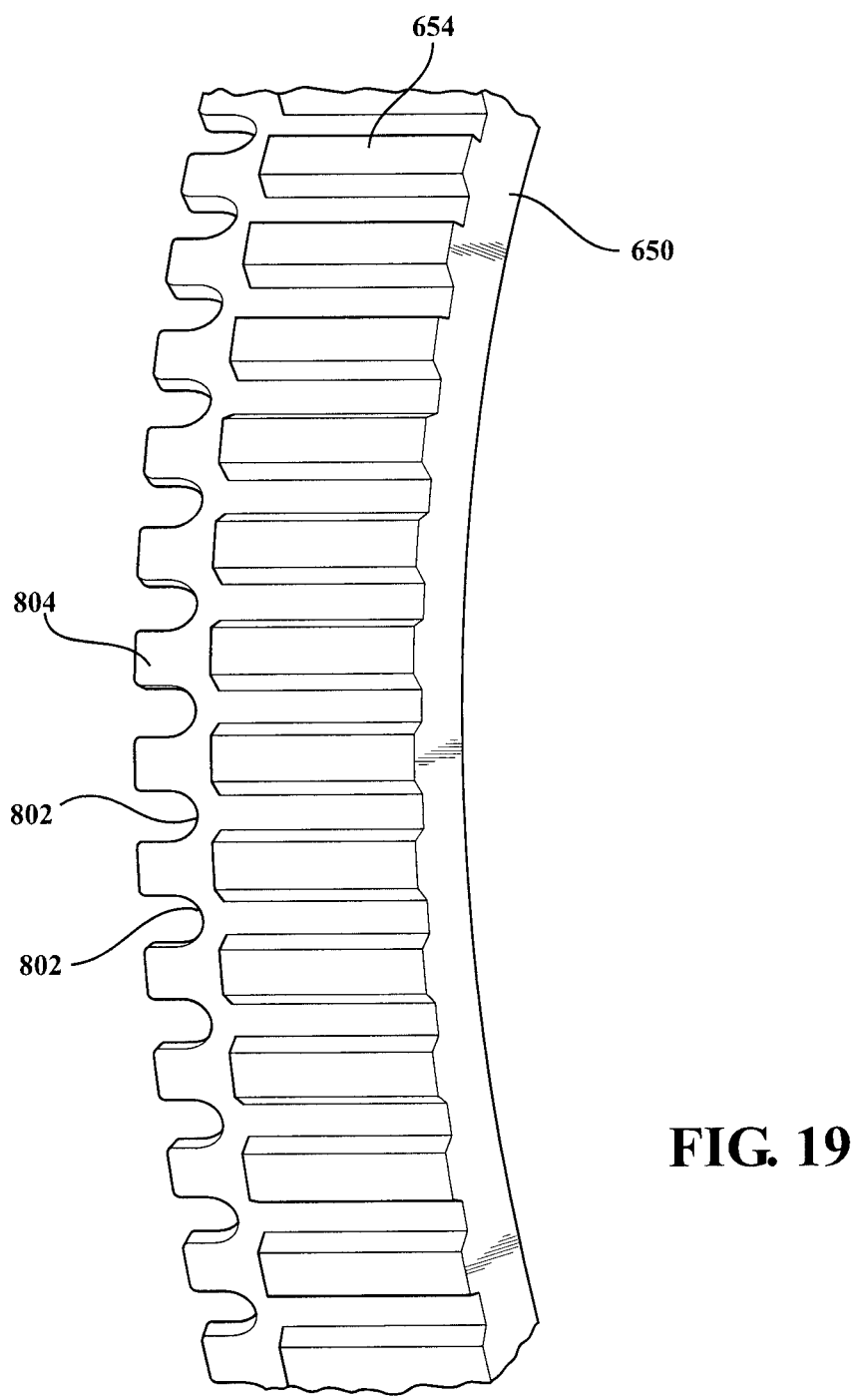
FIG. 19 is a view illustrating the locking feature integrated into the clutch module for use with the auxiliary locking assembly.

Electromagnetic actuator module 604 is configured to provide independent power-operated control of each electromagnetic actuator assembly 618A, 618B. Specifically, FIG. 15 illustrates the dual-acting functionality in that first electromagnetic actuator assembly 618A is shown actuated to define its lockup mode while second electromagnetic actuator assembly 618B is shown non-actuated to define its freewheel mode. In this situation, end segment 730A of active strut 720A is located in engagement with ratchet teeth 654 due to energization of coil assembly 710A. In contrast, end segment 730B of active strut 720B is located released from engagement with one of ratchet teeth 654 due to non-energization of coil assembly 710B. Thus, inner race assembly 608 is locked against rotation relative to outer race 606 in a first (i.e. clockwise) direction but is free to rotate in a second (i.e. counterclockwise) direction. If, under other circumstances, first electromagnetic actuator assembly 618A is non-actuated while second electromagnetic actuator assembly 618B is actuated, inner race assembly 608 would be locked against relative rotation in the second direction but would be free to rotate in the first direction. Obviously, both electromagnetic actuator assemblies 618A, 618B can be operating in their freewheel modes to permit relative rotation in both directions as well as both electromagnetic actuators 618A, 618B operating in their lockup modes to prevent rotation of inner race assembly 608 in both directions. It will be noted that, in this non-limiting embodiment, the arrangements of the electromagnetic actuator assemblies is mirror-imaged so as to provide the dual-acting functionality. Also, the profile of ratchet teeth 654 is configured to allow bi-directional locking as well as a ramp-over ratcheting action.

Cover plates 704A, 704B enclose the electromagnetic actuator assemblies within actuator frame 617. While not specifically shown, a printed circuit board (PCR) is disposed within each cover plate. Cover plates 704A, 704B also provide an electrical connection to the available power source.

One feature provided by clutch assembly 600 is its ability to be easily retrofitted into a transmission to replace a conventional multi-plate friction clutch. When conventional multi-plate friction clutches are disengaged, relative rotation between the stationary clutch plates and the rotating clutch plates (i.e. splined to drive hub 610) produces drag torque which is known to be detrimental to fuel economy. Clutch assembly 600 permits elimination of this drag torque completely using only a pair of independently controlled electromagnetic actuator assemblies to provide four (4) functional modes (i.e. lock-one way, lock-other way, lock-lock, freewheeling).

It is contemplated that any number of compressible connector elements 616 can be used to drivingly engage outer race 606 to inner race assembly 608. The multi-piece construction of inner race assembly 608 is not intended to limit the disclosure, but rather provide an opportunity to utilize compressible connector elements 616 to provide a spring-biased drive connection that is capable of absorbing transient torque spikes and dampen strut engagement forces. Compression springs 616 can be curved (as shown), straight, or replaced with other compressible resilient bodies such as elastomeric or rubber blocks. Typically, compression springs 616 are mounted in plastic sleeves or carriers (not shown) to assist in preventing excessive friction between the spring pockets/windows and the spring itself. First inner race member 612 (inner race "inner" member) is stamped to ensure low weight while second inner race member 614 (inner race "outer" member) is a powder metal component configured to withstand radially inwardly directed loads transmitted from the struts during torque transmission.

In accordance with another advantageous feature of the present disclosure, the radial interface between the two inner race assembly components (first inner race member 612, and second inner race member 614) can be used to provide damping. Specifically, since inner race assembly 608 is rotating relative to outer race 606, the friction therebetween can be "tuned" to provide adjustable damping. Since first inner race member 612 is centered and has its inner flange segment 636 riding on inner rim 626 of aluminum outer race 606, it will always be concentric to outer race 606. During strut engagement, a radially directed force is generated between the active strut 720 and second inner race member 614, with this force acting to move inner race assembly 608 sideways. However, this force is reacted by first inner race member 612 and outer race 606 via engagement of inner cylindrical flange segment 636 with inner cylindrical rim 626. Because this radial force is directly proportional to the reacted torque, the normal force created between the two inner race members and, consequently the damping capability, will vary directly proportional to the reacted torque itself. At least one of the outer surface of inner rim 626 and the inner surface of inner flange segment 636 can be coated (i.e. deposited) with a friction coating or material to enhance the damping characteristics of the interface, in a similar manner as used with friction plates in a conventional multi-plate friction disc clutch.

Referring now to FIGS. 16-21, a second non-limiting embodiment of a dual-acting selectable one-way coupling (SOWC) device 600' is shown to be a modified version of SOWC device 600 (FIGS. 11-15) which is now equipped with a power-off auxiliary locking assembly 800. Due to the commonality of most components of SOWC device 600' with those components previously described in association with SOWC device 600, the same reference numerals are used to identify such common components.

As seen, auxiliary locking assembly 800 is operatively associated with a plurality of locking notches 802 formed on an axial extension 804 of cylindrical outer lip segment 650 on second inner race member 614 of inner race assembly 608. In fact, a continuous series of equally-spaced locking notches 802 extend around the entire edge surface of second inner race member 614. Auxiliary locking assembly 800 includes a linear actuator solenoid 810 and a roller bracket unit 812. Linear actuator solenoid 810 has a bi-stable plunger piston 814 moveable relative to a solenoid housing 816 between a retracted position and an extended position. Roller bracket unit 812 is fixed for common movement with plunger piston 814 and includes a bracket 818 and a locking element, shown as roller 820. Bracket 818 of roller bracket unit 812 is mounted to outer race 616 (or another fixed structural component) for bi-directional translational movement relative to inner race assembly 608. As best shown in FIGS. 20 and 21, bracket 818 includes a first groove 822 configured to retain opposite ends of roller 820 therein, and a second groove 824 aligned orthogonally with respect to first groove 822. Upon assembly of auxiliary locking assembly 800 to SOWC device 600', second groove 824 is aligned with extension 804 of outer lip segment 650 on second inner race member 614.

In operation, roller bracket unit 812 is located in an unlatched position when plunger piston 814 is located in its retracted position and is located in a latched position when plunger piston 814 is located in its extended position. When roller bracket unit 812 is located in its unlatched position, roller 820 is displaced from engagement with locking notches 802, thereby permitting bi-directional rotation of inner race assembly 608 relative to outer race 600. In contrast, location of roller bracket unit 812 in its latched position causes roller 820 to be seated within one of locking notches 802, thereby locking inner race assembly 608 against bi-directional rotation relative to outer race 606. Thus, roller bracket unit 812 is configured to move roller 820 with respect to locking notches 802 as well as to transfer the locking load from inner race assembly 608 to outer race 606 or another structural component (i.e. the transmission housing). Auxiliary locking assembly 800 is considered to define an unlatched mode when roller bracket unit 812 is located in its unlatched position and to define a latched mode when bracket unit 812 is located in its latched position. Controlled actuation of solenoid 810 function to move piston plunger 814 between its retracted/extended position and, in turn, move roller bracket unit 812 between its unlatched/latched positions. It will be understood that controlled actuation of locking assembly 800 can be coordinated with that of one or both electromagnetic actuator assemblies 718A, 718B to establish a power-off locked mode in addition to the available modes previously disclosed for clutch assembly 600, 600'.

Integration of auxiliary locking assembly 800 into dual-acting SOWC device 600' permits power off bi-directional locking with both electromagnetic actuators 718A, 718B non-actuated so as to locate the active struts 720A, 720B in their non-deployed position. Thus, continued actuation of at least one of electromagnetic actuator assemblies 618A, 618B is not required to establish a lockup condition which minimizes total power consumption requirements and extends service life. Preferably, solenoid 810 is of the bi-stable type such that it can hold both positions of piston plunger 814 in a power-off condition. Actuation of solenoid 810 is only required to move roller bracket unit 812 to its lateral position when the latched mode is desired and subsequently to move roller bracket unit 812 to its unlatched position to retract roller 820 from locking notches 802 when this latched mode is no longer required. The roller 820 can be disengaged under load by simply powering up solenoid actuator 210.

Figure 22:
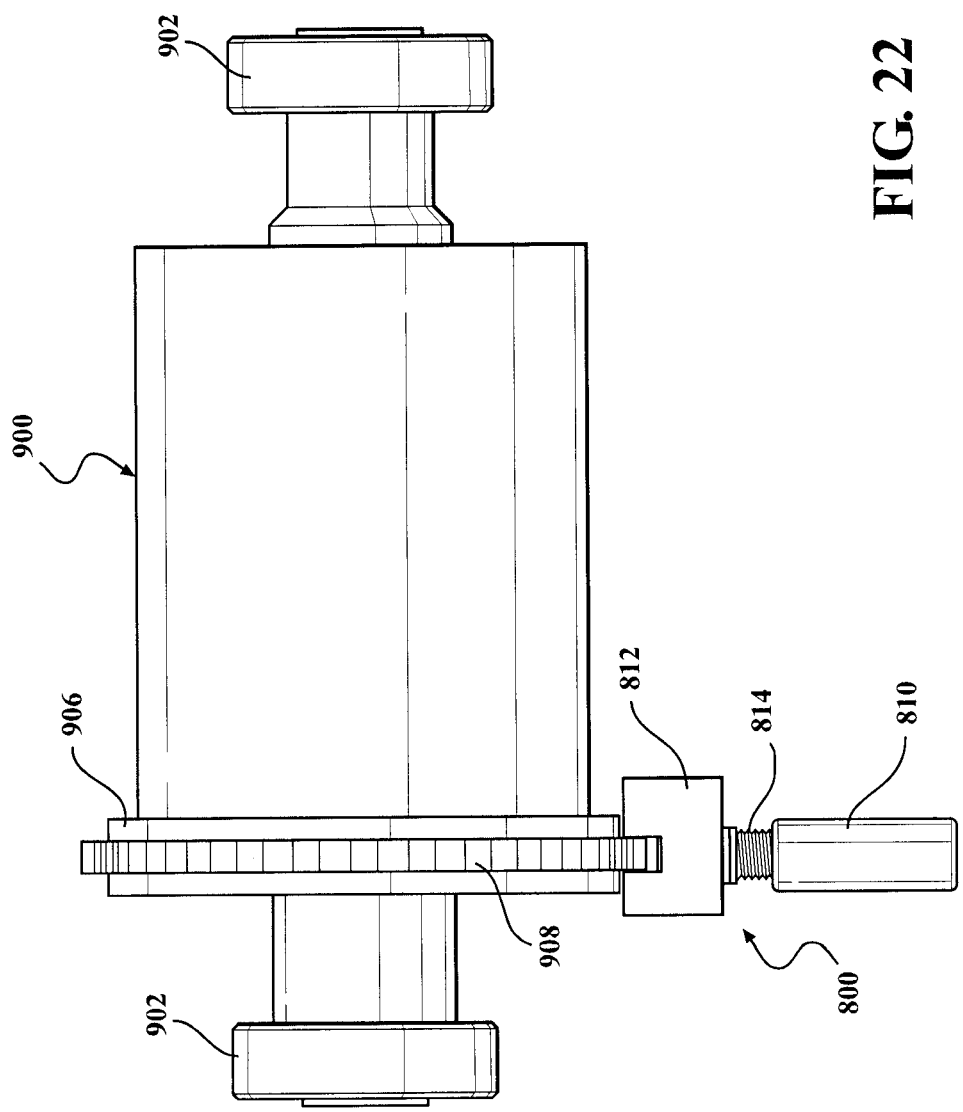
FIGS. 22-24 illustrate integration of the auxiliary locking assembly with an electric motor.
Figure 23:
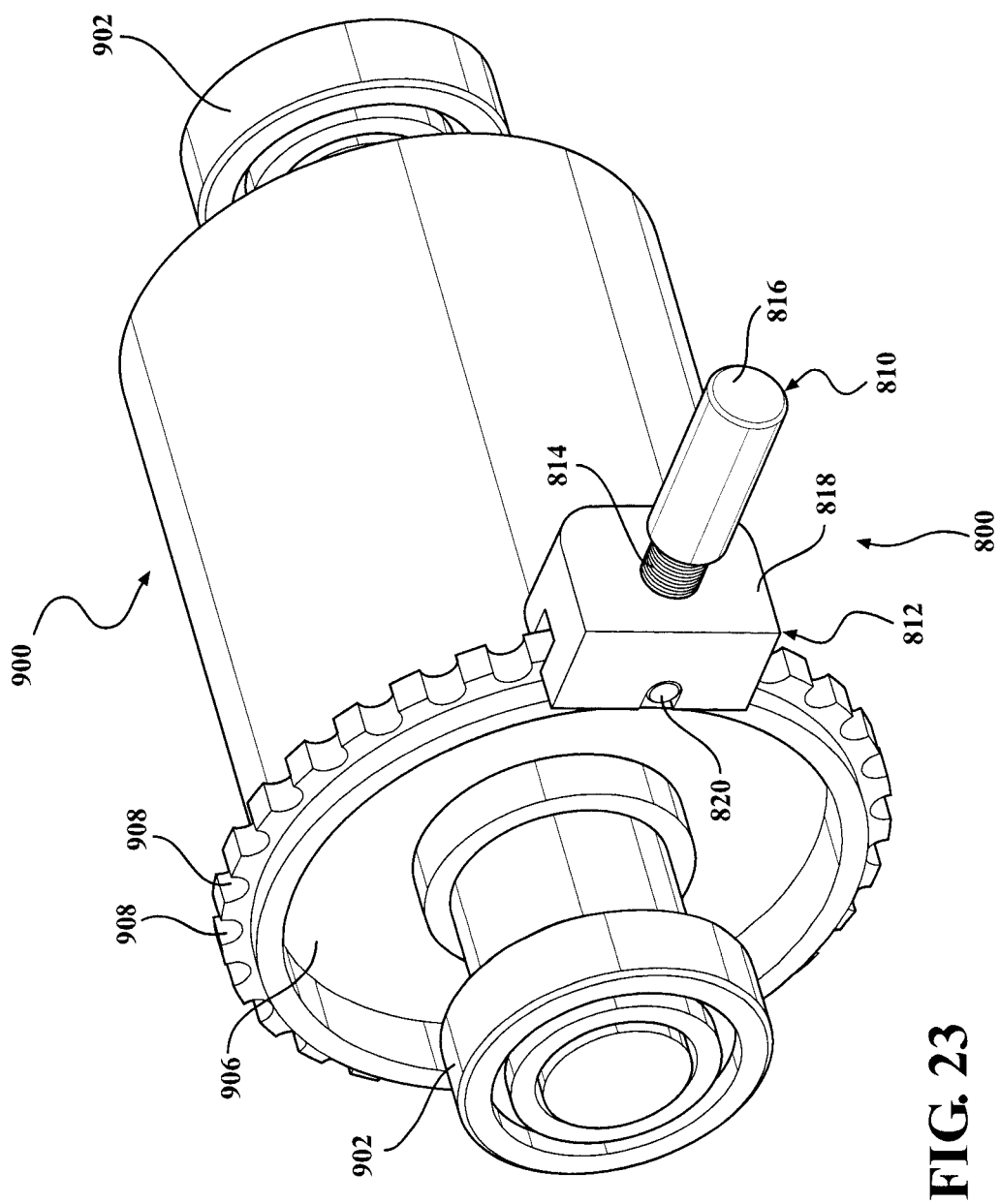
Figure 24:
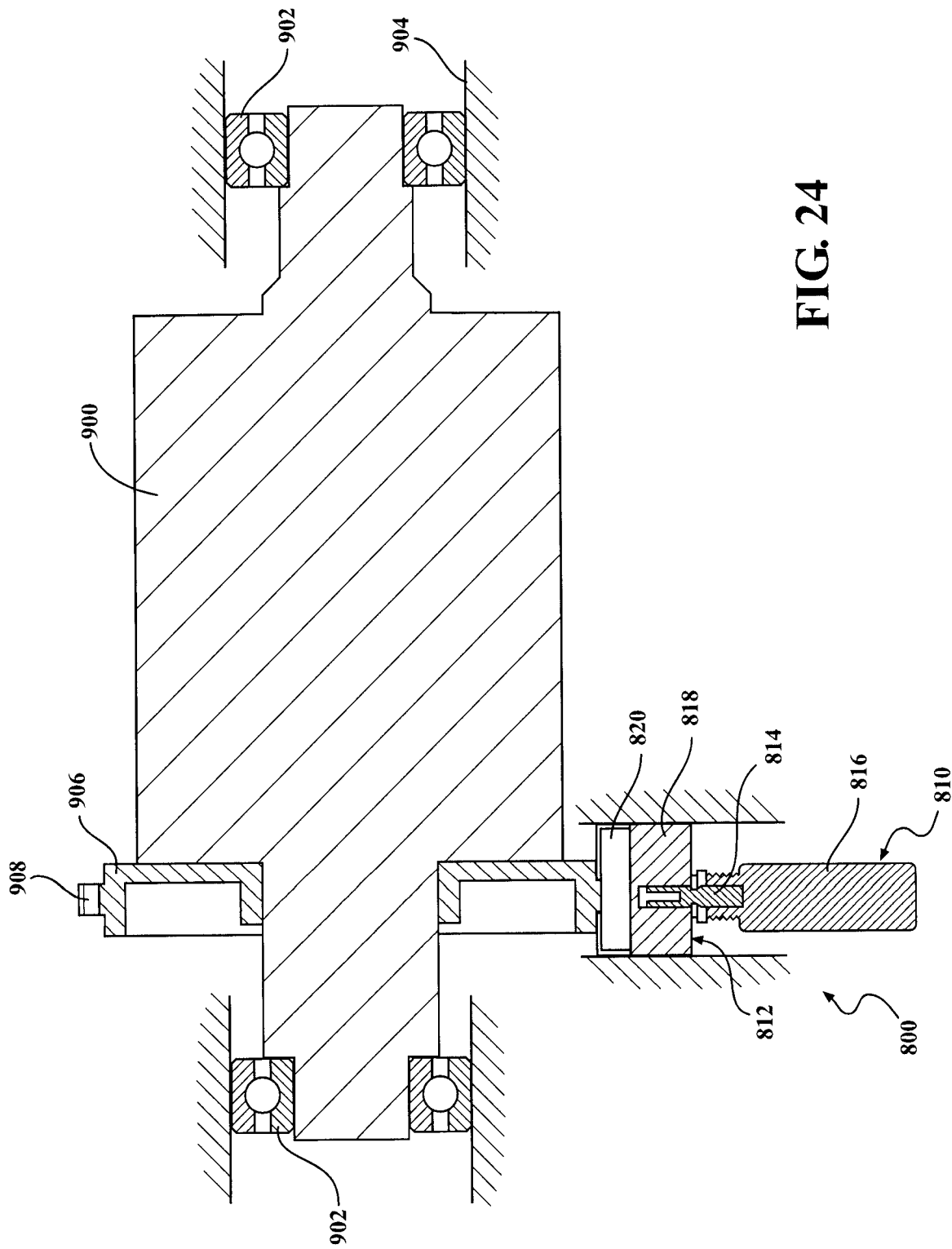

Finally, FIGS. 22-24 illustrate another non-limiting application for locking assembly 800. A rotor 900 of an electric motor is shown rotatably supported by a pair of laterally-spaced bearing 902 from a motor case 904. A locking ring 906 with locking notches 908 is fixed for rotation with rotor 900. As before, solenoid 810 can be powered to move plunger piston 814 between retracted and extended positions for causing corresponding movement of bracket unit 812 between unlatched and latched positions relative to locking notches 908. Since roller 820 can be released under load, even if there is torque loading on rotor 900, roller 820 can be moved to disengage locking ring 906. Solenoid 810 can be mounted as shown to act in a radial direction or alternatively configured to be mounted axially, parallel to the rotor's axis of rotation.

As noted, the utilization of a multi-piece damped inner race assembly and/or the integration of the locking mechanism into selectable one-way coupling devices is not intended to be limited to electromagnetic-type actuators and active strut assemblies provided as examples herein. Direct acting strut actuation type actuators can also be considered within the intended scope of the present disclosure, as well as single-acting and dual-acting versions of both radially-stacked and axially-stacked SOWC devices.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A selectable one-way coupling device, comprising:
a clutch module including a first clutch component and a second clutch component supported for rotation relative to the first clutch component, the second clutch component configured to include a first member, a second member, and a plurality of compressible connector members drivingly connecting the first and second members, wherein first locking teeth are formed on the second member, wherein the first clutch component includes a cylindrical outer rim, a cylindrical inner rim and a plate segment extending radially between the outer rim and the inner rim so as to define an annular inner race cavity therebetween, and wherein the second clutch component is rotatably disposed within the inner race cavity; and
an electromagnetic actuator module having an actuator frame and at least one electromagnetic actuator assembly, the actuator frame adapted to be secured to the first clutch component, the electromagnetic actuator assembly including an energizable coil assembly secured to the actuator frame, an active strut pivotably coupled to the actuator frame and moveable between a non-deployed position when the coil assembly is non-energized and a deployed position when the coil assembly is energized, and a biasing member for normally biasing the active strut toward its non-deployed position, wherein the active strut is displaced from engagement with the first locking teeth when located in its non-deployed position to establish a freewheel mode, and wherein the active strut is lockingly engaged with the first locking teeth when located in its deployed position to establish a lockup mode.

2. The selectable one-way coupling device of claim 1, wherein the compressible connector members are compression springs.

3. The selectable one-way coupling device of claim 1, wherein the compressible connector members are elastomeric blocks.

4. The selectable one-way coupling device of claim 1 further comprising an auxiliary locking mechanism having a power-operated actuator configured to move a latching unit between an unlatched position and a latched position relative to second locking teeth formed on the second member of the second clutch component, wherein the latching unit operates to disengage the second locking teeth and permit rotation of the second clutch component relative to the first clutch component when located in its unlatched position, and wherein the latching unit operates to engage the second locking teeth to prevent rotation of the second clutch component relative to the first clutch component when located in its latched position.

5. The selectable one-way coupling device of claim 4, wherein the electromagnetic actuator module includes first and second electromagnetic actuator assemblies, wherein the first electromagnetic actuator assembly is arranged to selectively engage the first locking teeth and prevent rotation of the second clutch component relative to the first clutch component in a first direction, and wherein the second electromagnetic actuator assembly is arranged to selectively engage the first locking teeth and prevent rotation of the second clutch component relative to the first clutch component in a second direction.

6. The selectable one-way coupling device of claim 4 wherein the second member of the second clutch component includes an outer cylindrical lip segment and a radial ring segment extending radially inwardly from the outer cylindrical lip segment, wherein the first locking teeth are formed on the outer cylindrical lip segment, wherein an axial extension extends axially from the outer cylindrical lip segment, and wherein the second locking teeth are defined by the axial extension.

7. The selectable one-way coupling device of claim 6 wherein the latching unit is a roller bracket unit including a bracket and a roller, wherein the bracket defines a first groove slideably retaining opposite ends of the roller and a second groove aligned orthogonally with respect to the first groove and receiving the outer cylindrical lip segment of the second clutch component, wherein the roller is moveable between the unlatched position and the latched position, wherein the roller is disengaged from the second locking teeth when the roller is in the unlatched position, and wherein the roller is positioned between a pair of the second locking teeth when the roller is in the latched position.

8. The selectable one-way coupling device of claim 1, wherein the first member of the second clutch component includes an outer cylindrical flange segment, an inner cylindrical flange segment, and a radial web segment extending radially between the outer cylindrical flange segment and the inner cylindrical flange segment.

9. The selectable one-way coupling device of claim 8 wherein a drive hub is positioned radially inward of the second clutch component and drivingly connected to the second clutch component.

10. The selectable one-way coupling device of claim 9 wherein the inner cylindrical flange segment presents a plurality of splines coupled with the drive hub.

11. The selectable one-way coupling device of claim 8 wherein a portion of the inner cylindrical flange segment is rotatably supported on the inner rim of the first clutch component.

12. The selectable one-way coupling device of claim 8 wherein the second member of the second clutch component includes an outer cylindrical lip segment and a radial ring segment extending radially inwardly from the outer cylindrical lip segment, and wherein the first locking teeth are formed on the outer cylindrical lip segment.

13. The selectable one-way coupling device of claim 12 wherein a plurality of alternating arcuate grooves and driven pockets are defined by the radial ring segment.

14. The selectable one-way coupling device of claim 13 wherein the compressible connector members are each disposed within one of the driven pockets.

15. A selectable one-way coupling device, comprising:
a clutch unit including a first clutch component and a second clutch component supported for rotation relative to the first clutch component, the second clutch component configured to include a first member, a second member, and a plurality of compressible connector members drivingly interconnecting the first and second members, wherein first locking teeth are formed on the second member;

an electromagnetic actuator module having an actuator frame and an electromagnetic actuator assembly, wherein the actuator frame is secured to the first clutch component, wherein the electromagnetic actuator assembly includes an energizeable coil assembly secured to the actuator frame, an active strut pivotably coupled to the actuator frame for movement between a non-deployed position when the coil assembly is non-energized and a deployed position when the coil assembly is energized, and a biasing member for biasing the active strut toward its non-deployed position; and an auxiliary locking mechanism having a latching unit and a power-operated actuator configured to move the latching unit between an unlatched position and a latched position relative to second locking teeth formed on the second member of the clutch component, wherein the latching unit operates to disengage the second locking teeth and permit rotation of the second clutch component relative to the first clutch component when located in its unlatched position and to engage the second locking teeth and prevent rotation of the second clutch component relative to the first clutch component when located in its latched position.

16. The selectable one-way coupling device of claim 15, wherein the electromagnetic actuator module includes first and second electromagnetic actuator assemblies, wherein the first electromagnetic actuator assembly is arranged to selectively engage the first locking teeth for preventing rotation of the second clutch component relative to the first clutch component in a first direction, and wherein the second electromagnetic actuator assembly is arranged to selectively engage the first locking teeth for preventing rotation of the second clutch component relative to the first clutch component in a second direction.

17. The selectable one-way coupling device of claim 15, wherein the second member of the second clutch component includes an outer cylindrical lip segment and a ring segment extending radially from the outer cylindrical lip segment, wherein the first locking teeth are formed on the outer cylindrical lip segment and wherein the second locking teeth are formed on an axial extension extending from the outer cylindrical lip segment.

18. The selectable one-way coupling device of claim 15, wherein the first clutch component includes an outer cylindrical rim segment, an inner cylindrical rim segment and a plate segment interconnecting the outer and inner rim segments to define an inner race cavity therebetween, wherein the second clutch component is rotatably disposed within the inner race cavity, wherein the first member of the second clutch component is configured to include an outer cylindrical flange segment, an inner cylindrical flange segment and a web segment extending radially between the outer and inner cylindrical flange segments, wherein the second member of the second clutch component is configured to include an outer cylindrical lip segment, an inner cylindrical lip segment and a ring segment extending radially between the outer and inner cylindrical lip segments, and wherein the first locking teeth are formed on the outer cylindrical lip segment.

19. A selectable one-way coupling device, comprising:

a clutch unit including an outer race defining an annular race cavity and an inner race assembly disposed within the race cavity for rotation relative to the outer race assembly, the inner race assembly configured to include a first inner race member, a second inner race member having first locking teeth, and a plurality of compressible connector members drivingly connecting the first and second inner races;

an actuator module having a frame adapted to be secured to the outer race, a first electromagnetic actuator assembly mounted to the frame, and a second electromagnetic actuator assembly mounted to the frame, wherein the first electromagnetic actuator assembly includes a first energizable coil and a first active strut moveable between a non-deployed position whereat the first active strut is disengaged from the first locking teeth and a deployed position whereat the first active strut is engaged with the first locking teeth to prevent rotation of the inner race assembly relative to the outer race in a first direction, and wherein the second electromagnetic actuator assembly includes a second energizable coil and a second active strut moveable between a non-deployed position whereat the second active strut is disengaged from the first locking teeth and a deployed position whereat the second active strut engages the first locking teeth to prevent rotation of the inner race assembly relative to the outer race in a second direction; and an auxiliary latching unit mounted to the frame and having a power-operated actuator configured to move a latching unit between a latched position and an unlatched position relative to second locking teeth formed on the second inner race member, wherein the latching unit is operable in its unlatched position to disengage the second locking teeth and is operable in its latched position to engage the second locking teeth and prevent rotation of the inner race assembly in both the first and second directions.

* * * * *